(12) United States Patent
Kobayashi et al.

(10) Patent No.: US 9,020,075 B2
(45) Date of Patent: Apr. 28, 2015

(54) DATA SIGNAL IMPROVEMENT USING SIGNAL PEAK DETECTORS IN A RECEIVER

(75) Inventors: Osamu Kobayashi, Los Altos, CA (US); Gyo Un Choi, Cupertino, CA (US)

(73) Assignee: STMicroelectronics, Inc., Coppell, TX (US)

( * ) Notice: Subject to any disclaimer, the term of this patent is extended or adjusted under 35 U.S.C. 154(b) by 747 days.

(21) Appl. No.: 12/711,781

(22) Filed: Feb. 24, 2010

(65) Prior Publication Data

US 2010/0296562 A1 Nov. 25, 2010

Related U.S. Application Data

(60) Provisional application No. 61/180,070, filed on May 20, 2009.

(51) Int. Cl.
*H03K 9/00* (2006.01)
*H04L 25/03* (2006.01)

(52) U.S. Cl.
CPC ................................ *H04L 25/03006* (2013.01)

(58) Field of Classification Search
USPC .................. 375/316, 340, 343, 345, 357, 364
See application file for complete search history.

(56) References Cited

U.S. PATENT DOCUMENTS

| 2004/0190560 A1* | 9/2004 | Maltsev et al. | 370/503 |
| 2007/0230403 A1* | 10/2007 | Douglas et al. | 370/334 |
| 2009/0010362 A1* | 1/2009 | Thaler | 375/340 |

* cited by examiner

*Primary Examiner* — Kabir A Timory
(74) *Attorney, Agent, or Firm* — Seed IP Law Group PLLC

(57) ABSTRACT

Methods and systems are described for improving a data at a receiver using one or more signal peak detectors. A signal is received having an initial signal level from the transmitter, the signal having a long bit and a short bit. The initial signal voltage of the signal is measured using a signal peak detector. A pre-emphasis value is determined using the signal voltage and is communicated to the transmitter, causing the transmitter to transmit the signal using an adjusted signal level. A second signal voltage of the initial signal is measured using a second signal peak detector, the second signal voltage being used to determine the pre-emphasis value. In another embodiment, a state machine having data relating to appropriate pre-emphasis is used in determining the pre-emphasis value. In another embodiment, one peak detector is used to measure the long bit and another peak detector is used to measure the short bit. In another embodiment, the signal does not have associated link training data.

20 Claims, 18 Drawing Sheets

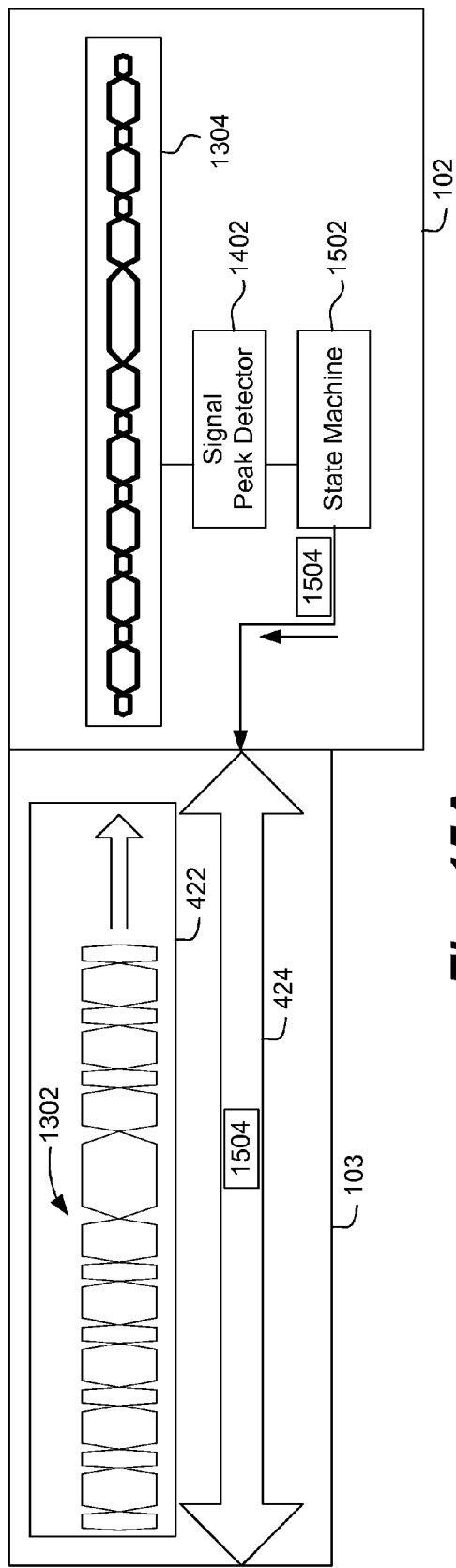
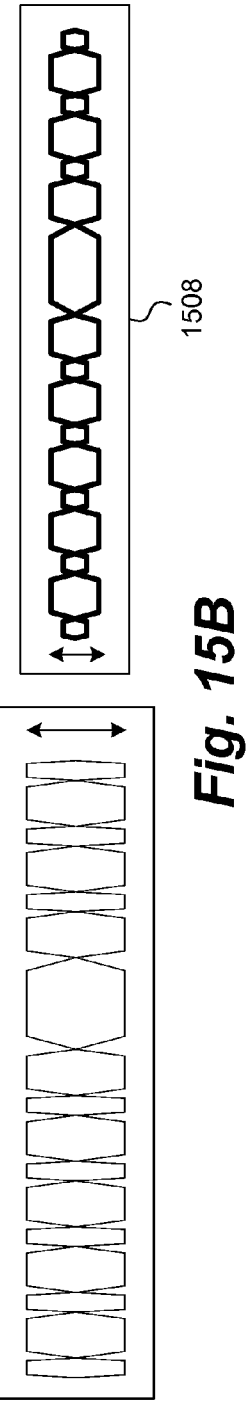
Fig. 15A
Fig. 15B

DATA SIGNAL IMPROVEMENT USING SIGNAL PEAK DETECTORS IN A RECEIVER

CROSS-REFERENCE TO RELATED APPLICATIONS

This application claims priority under 35 U.S.C. §119(e) to Provisional Patent Application No. 61/180,070, filed May 20, 2009 entitled "Optimization method to improve the performance of link data-to-clock recovery of high-speed serial data interface", which is incorporated by reference herein in its entirety.

TECHNICAL FIELD

The present invention relates generally to communication of various types of data in a multimedia network. More specifically, it relates to improving the strength of a data signal sent over a data link to a receiver in the network.

BACKGROUND OF THE INVENTION

Currently, multimedia networks are relatively uncomplicated in their handling of "hot plug" events. In general, a "hot plug" event is a situation where an active device is plugged into an already active system. This can mean providing a powered-on device and plugging it into a network device that is also powered on or operating (typically using some sort of communication link). Also, it can mean providing a network of connected device with a first device in a power-on state and then powering up an already connected device. Such hot plugging describes changing or adding components which interact with an operating system or active device. Ideally, this should occur without significant interruption to the system. Moreover, such hot plugging should enable the changing or adding of components a network device (in one example, a computer or a monitor) while it is operating.

In existing devices, such hot plug events flow somewhat seamlessly when a device's operating system is fully booted up and operational. However, difficulties begin to arise when a "hot plug" event or an unplug/re-plug event occurs before the device operating system is fully booted up and operational. In such conditions, the interrupt handing mechanisms of many systems and devices are unable to cope with the events. In some cases, unanticipated interrupt events may disrupt systems ill suited to accommodate such events. Moreover, such interrupt handling can cause serious system incompatibility issues between the various components and systems of the device and its peripheral systems. Furthermore, when applied to an audio-video network, and when a display is hot plugged into a source device, for a period of time after the hot plug event, there can be a significant period of time in which the display cannot display any valid video or other type of data. This can be problematic in conditions where video data, a visual display, for example, is required to obtain further user input (e.g., "Press F8 for modifying BIOS"), as well a presenting a general inconvenience. Under these circumstances there is an increasing need for methods and systems capable of displaying video data in a number of hot plug situations that are not addressed in current network devices and systems.

While existing systems and methods work well for many applications, there is an increasing demand for display methodologies, systems, and integrated circuits that enable the display of audio-video data in a wider range of operational circumstances and with greater capacity to enjoy the benefits of modern multimedia equipment, software and devices. For these goals to be met, it is desirable to maintain the strongest possible signal strength of the audio-video data being transmitted in the network.

SUMMARY OF THE INVENTION

In one aspect of the invention, a method of adjusting a signal between a transmitter and a receiver is described. A signal is received having an initial signal level from the transmitter, the signal having a long bit and a short bit. The initial signal voltage of the signal is measured using a signal peak detector. A pre-emphasis value is determined using the signal voltage and is communicated to the transmitter, causing the transmitter to transmit the signal using an adjusted signal level. In another embodiment, a second signal voltage of the initial signal is measured using a second signal peak detector, the second signal voltage being used to determine the pre-emphasis value. In another embodiment, a state machine having data relating to appropriate pre-emphasis is used in determining the pre-emphasis value. In another embodiment, one peak detector is used to measure the long bit and another peak detector is used to measure the short bit. In another embodiment, the signal does not have associated link training data.

In another aspect of the invention, a method of adjusting a signal received at a receiver from a transmitter is disclosed. An initial signal having an initial signal level is received from the transmitter, the signal having a long bit and a short bit. An initial signal voltage of the signal is measured using a first signal peak detector. Based on the reading from the detector, internal settings of the receiver are adjusted, thereby creating an adjusted signal. In another embodiment, a second signal voltage of the initial signal is measured using a second signal peak detector. The internal settings are adjusted using a state machine having data relating to appropriate internal settings.

In another aspect of the invention, an integrated circuit device for improving the quality of an incoming signal at a receiver is described. The IC device includes signal peak detection circuitry for measuring the incoming signal. In one embodiment, this circuitry may include two signal peak detection circuits. The IC device also includes a state machine module for determining suitable pre-emphasis values, a clock, a link interface operational with a data link, and link communication circuitry for examining the incoming signal for link training data. In one embodiment, an internal settings module for adjusting the settings in the receiver may also be included on the IC device.

General aspects of the invention include, but are not limited to methods, systems, apparatus, and computer program products for enabling message transmission in multimedia device networks. Aspects include system configuration and dynamic adjustment of messaging formats based on hot plug events as well as other circumstances.

BRIEF DESCRIPTION OF THE DRAWINGS

The invention and the advantages thereof may best be understood by reference to the following description taken in conjunction with the accompanying drawings in which:

FIG. 15A is a detailed network diagram showing data link and receiver with a signal peak detector in accordance with one embodiment;

FIG. 15B shows the results of applying a request in the transmitter;

In the drawings, like reference numerals are sometimes used to designate like structural elements. It should also be appreciated that the depictions in the figures are diagrammatic and not to scale.

DETAILED DESCRIPTION OF EXAMPLE EMBODIMENTS

Reference is made to particular embodiments of the invention. One example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

Aspects of the invention pertain to methods and systems for enabling multimedia data transmission and display in the absence of full link training and the implementation of self-configuration to enable multimedia data transmission and display after hot plug events.

Figure 1:
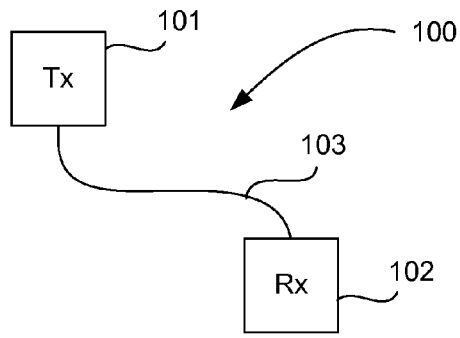
FIG. 1 illustrates a simplified network embodiment of a multi-media network in accordance with the principles of the invention.

In ordinary operation of multimedia systems a number of sink devices, source devices, as well as other network devices (routers, splitters, etc.) are linked together in a multimedia network. FIG. 1 illustrates a highly simplified example multimedia network 100 comprising a source device 101 and a sink device 102 linked by a data link 103.

Example source devices 101 include, but are not limited to any device capable of producing or transmitting multimedia signal. In embodiments of this invention the signal comprises multimedia data that shall be interpreted broadly. Moreover, throughout the specification and claims multimedia and audio-video signal shall be used interchangeably and have the same meaning. Accordingly, such multi-media content can include, but is not limited to, video, still images, animation, text, audio (sound, music, etc.) and interactive content, as well as combinations of all of the foregoing.

Again, in general, source devices 101 are those devices that capture, generate, or transmit multimedia content. Particular source devices 101 include, but are not limited to set top boxes, DVD players, cameras, video recorders, game platforms, computers, HD video devices, VCR devices, radio, satellite boxes, music players, content capture and content generation devices, and many other such source devices beyond those referenced above.

The network 100 can further include one or more sink devices 102. As used herein, example sink devices 102 can comprise any device capable of receiving and/or consuming multi-media content. For example, particular embodiments can include, but are not limited to, audio devices, display devices, stereo equipment, receivers, game devices, and many other such audio-video sink devices.

Other network devices applicable to this invention include, but are not limited to multimedia hubs, splitters, concentrators, switchable devices with many inputs and fewer outputs, replicators, concentrators, and many other types of branch devices that can link various combinations of components together. These branch devices modernly are mixed with standard sink/source capabilities and so are well suited to applications of this invention. It should be noted that many devices combine traditional source and sink functionalities, and also such network devices can include a wide range of devices combining other of these functions.

During operation of the networked systems it may at some time become necessary or desirable to "hot plug" various components. As used here "hot plugging" describes changing or adding components which interact with another network device in a power on configuration. In general, "hot plugging" is the act of connecting a powered device into another network device or the act of powering on a connected device. In one example, a powered second device is plugged into another device (first device). As just indicated, hot plugging also describes an event where the second and first devices are already connected (using for example, a data link) and then the second device is switched on. The "hot plug" being the switch on event. For reasons described later, these events are made more important if the first device is in the power on state during the event.

Additionally, hot plug events include unplugging a device and then re-plugging it (hot plugging being the re-plugging event). For example, when a sink device 102 (for example, a display device) is connected to an operating source device 101 (a computer or DVD or other such device) a hot plug event occurs.

Accordingly, the actual hot plug event occurs when the second device is both connected and in a power on state. Under most operating conditions such hot plug events are commonplace and somewhat unremarkable as the operating system of the device 101 is configured to anticipate and handle such events. However, in certain circumstances such hot swap or hot plug events can prove troublesome.

Figure 2A:
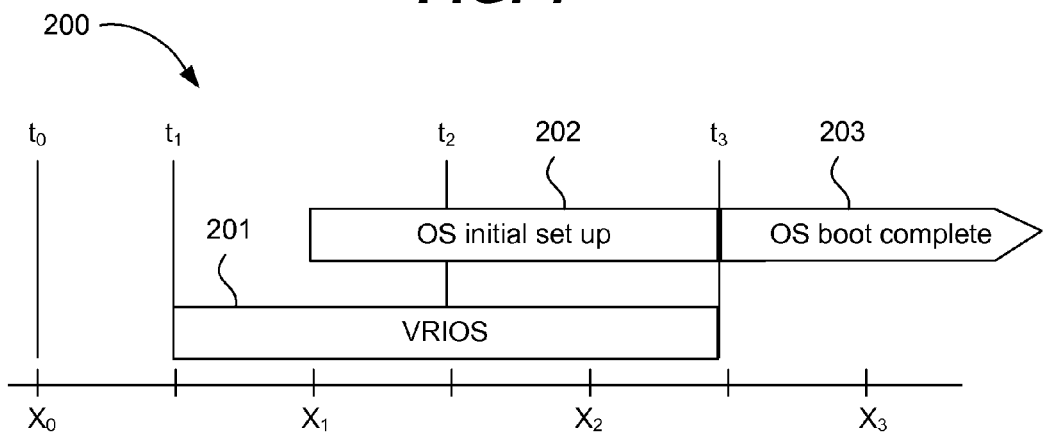
FIG. 2A illustrates a timing diagram useful for illustrating problems and solutions in accordance with the principles of the invention.

FIG. 2A is a timing diagram 200 that illustrates, in a very general way, a start up cycle for an example electronic device (e.g., 101) and the effects of various hot plug events. This representative example uses a network 100 such as that of FIG. 1. In this example, the device 101 (source) will comprise a computer device and device 102 (sink) will comprise a display device. For purposes of illustration four different time markers ($t_0$, $t_1$, $t_2$, $t_3$) are illustrated. Time $t_0$ is an arbitrary time used in an explanatory discussion of a start up process for device 101. At $t_1$ the device 101 is powered on. Subsequently the Video Basic Input/Output System (VBIOS) of device 101 initiates operation 201. At $t_2$ the main operating system (e.g., LINUX®, Windows®, Darwin®, and many others) of the device 101 begins a boot up process 202. At $t_3$ the main operating system is fully booted up 203 and begins operation. As such, after $t_3$ the main operating system takes over operation of the device 101.

Figure 2B:
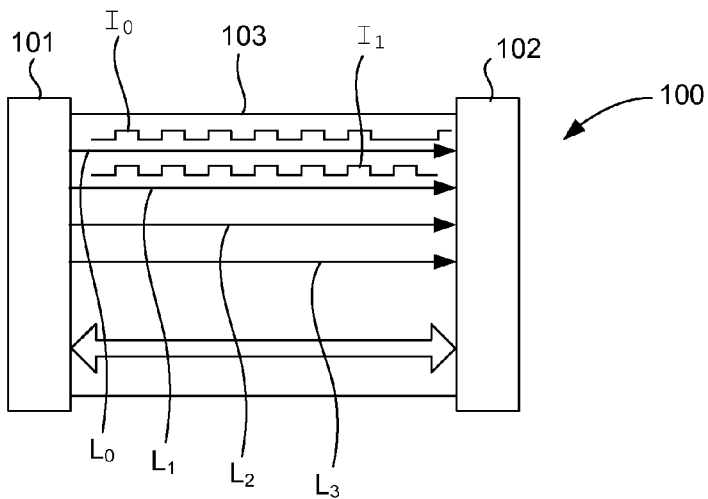
FIG. 2B illustrates a simplified network embodiment of a multi-media network transmitting an audio-video signal in data channels of a data link.

Additionally, FIG. 2B illustrates a number of power on or hot plug "events" ($x_0$, $x_1$, $x_2$, $x_3$). The events ($x_0$, . . . , $x_3$) each identify a moment of a hot plug event for device 102 (i.e., the moment device 102 is both connected with device 101 and in a power on state).

To explain, in this example, at $t_0$, the device 102 is connected with the device 101 and is powered on at $x_0$. Thus, the hot plug event $x_0$ occurs prior to the powering on of the source device 101 at $t_1$. This is a common default state and when the device 101 is powered up the VBIOS 201 of the device 101 recognizes the connected and powered sink device 102. Accordingly, at $t_1$ the VBIOS of the source device initiates the standard start up and initiation protocols enabling data to be transmitted to the sink 102. During a typical start up routine the VBIOS operates the drivers and systems enabling correct operation of the sink 102 until the operating system fully boots up 203 and begins to manage the device 101 operation (and the sink 102). Ordinarily, the VBIOS is capable of operating and interacting with the sink device 102 and performing the necessary configuration prior to operating system boot without complication.

At $t_2$ the operating system begins to boot up 201 and the VBIOS is still handling the majority of system interrupts and system calls. This boot up beginning period 202 is also discussed herein as a "dark period" where the operating system is not fully able to operate the device 101. After the dark period, at time $t_3$, the operating system is fully booted up 203 and the ordinary operation of the operating system occurs.

Referring again to FIG. 2A, events $x_1$, $x_2$, $x_3$, are briefly described. The event $x_3$ describes a hot plug event occurring after the operating system has become fully active or is operating in a safe mode. During this period, after a hot plug event $x_3$, the source 101 will receive a hot plug detect message (HPD) sent by the sink 102 upon connection. During the operation of the operating system (203) the operating system receives the HPD message and acknowledges that it has received the HPD. Thereafter the source transmits link training information along with associated audio-video signal. This enables the sink to initiate a link training protocol that enables the sink 102 to reconstruct the data streams sent from the source 101 through the data link 103. The process of link training will be described elsewhere in this application. The methods and systems required to do such link training are disclosed in other patents and will not be described in detail here.

With reference to FIG. 2A, events $x_1$ & $x_2$ are briefly explained. The event $x_1$ describes a hot plug event that occurs after the activation of the VBIOS 201 after source 101 power on ($t_1$). The operating system has not become active at this point. As indicated above, the VBIOS system works reasonable well when the sink is powered on and is connected prior to the start of the VBIOS (i.e., before $t_1$ for example at time $t_0$). The VBIOS operates the sink 102 with VBIOS drivers and configuration systems. However, if a hot plug event occurs after the initiation of the VBIOS the VBIOS interrupt handling systems are not suitable for enabling effective configuration of the source device to handle the newly hot plugged sink device. In particular the VBIOS system is not capable of responding to the HPD message received from the sink and cannot initiate or operate link training. Moreover, the VBIOS interrupt handling may result in a wide array of system incompatibility problems that can yield unpredictable and undesirable results. Significantly, this situation will prevent the display of an audio-video signal sent by source 101 to display 102.

As stated above, in response to hot plug event $x_1$, and during the initial operation of VBIOS 201, the source 101 will receive a hot plug detect message (HPD) sent by the sink 102. However, during this period (201) the VBIOS receiving the HPD cannot recognize the HPD message sent by the sink. Moreover, it cannot respond to link state changes in the link 103 (such as occur during a hot plug event). Accordingly, during period 201 the source cannot provide link training information to the sink device. Absent this information, the sink cannot be configured to properly display the content at the sink 102. This is a shortcoming in the present state of the art.

With further reference to FIG. 2A, event $x_2$ is briefly explained. The event $x_2$ describes a hot plug event that occurs after the start up (at $t_2$) of the operating system (202) but before it becomes fully operational (the dark period). Thus, as with event $x_1$, the operating system has not become active at this point. As indicated previously, this interrupt is still handled by the VBIOS system and suffers from the same limitations. In particular, the VBIOS interrupt handling systems are not suitable for enabling effective link training, responding to the HPD message, and cannot sense state changes in the link 103. As before, this situation will prevent the display of video signal sent by source 101 to display 102 because the sink has not received configuration information from the source (indeed, the source does not even know to send the information) and cannot be configured. Accordingly, during dark period 202, after a hot plug event $x_2$, the source 101 will receive a hot plug detect message (HPD) sent by the sink 102. However, during this dark period 202 the VBIOS receives the HPD and cannot recognize the HPD messages sent by the sink. Accordingly, as described before, link training information will not be provided to the sink and the data cannot be properly displayed at the sink 102.

A more detailed description of the way the embodiments of the invention overcome these present limitations are explained below in greater detail in accord with FIGS. 5-8. A brief description of a communication protocol and link configuration is helpful prior to a fuller discussion of hot plug management.

Figure 3:
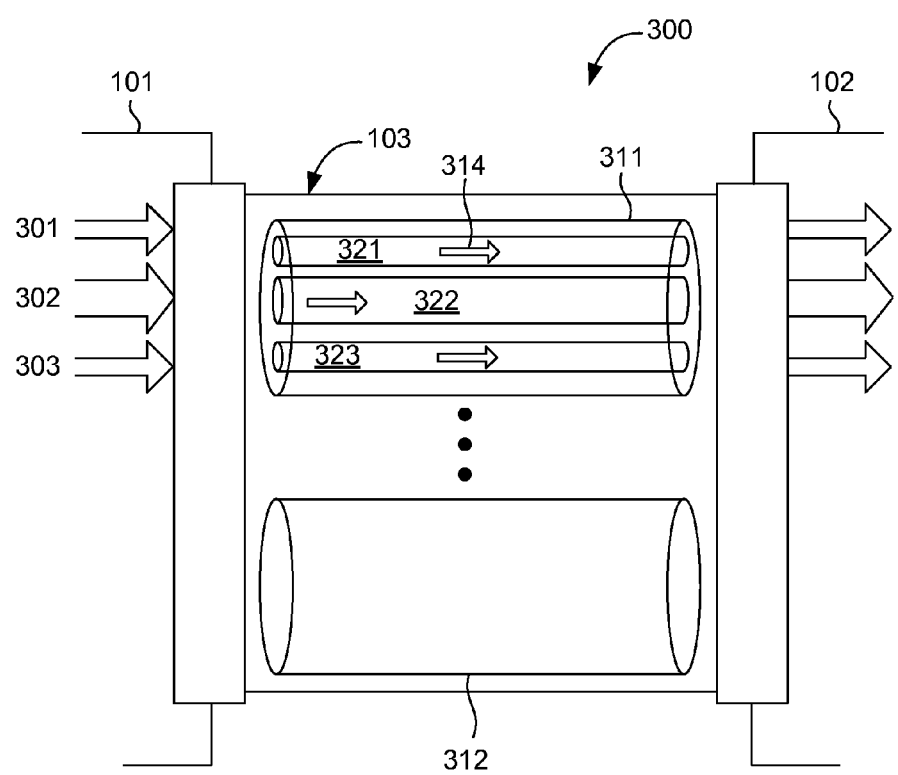
FIG. 3 illustrates an example link embodiment suitable for use in the networks described herein.

For example, FIG. 3 shows a generalized representation of a cross platform packet based digital video data transmission system 300 in accordance with an embodiment of the invention. The system uses a data link 103 to connect a transmitter 101 to a receiver 102. The data link 103 can include a plurality of separate uni-directional physical data channels 311, 312. Typically, the number of channels is 1, 2, or 4 but is not limited to such. In the described embodiment, a number of data streams 301-303 are received or generated at the transmitter 101. If needed the transmitter 101 packetizes each the data steams into a number of data packets 314. These data packets are then formed into corresponding data streams and each of the data streams are introduced into the data channel 311. In this embodiment, each data stream is passed into the associated data channels by way of an associated virtual pipe 321-323 to the receiver 102. It should be noted that the link rate (i.e., the data packet transfer rate) for each virtual link can be optimized for the particular data stream resulting in data streams each having an associated link rate (each of which could be different from each other depending upon the particular data stream). The data streams can take any number of forms such as video, graphic, audio, etc. The aggregate data rates of the virtual pipes 321-323 can define a link rate for the channel 311.

Typically, when the source is a video source, the data streams 301-303 include various video signals that can have any number and type of well-known formats, such as composite video, serial digital, parallel digital, RGB, or consumer digital video. The video signal can be an analog video signal which is converted to a digital format for transmission.

The digital video signal can be any number and type of well known digital formats such as, SMPTE 274M-1995 (1920× 1080 resolution, progressive or interlaced scan), SMPTE 296M-1997 (1280×720 resolution, progressive scan), as well as standard 480 progressive scan video, and many others such as is suitable for the networked devices.

It should be noted that the link rate is independent of the native stream rates (e.g., the native stream rate of the source device 101). The only requirement is that the link bandwidth of the channel of the data link 311 be higher than the aggregate bandwidth of data stream(s) to be transmitted through that channel. In the described embodiment, the incoming data (such as pixel data in the case of video data) is packed over the respective virtual link based upon a data mapping definition. In this way, the channel 311 (or any of the constituent virtual links) does not, as does conventional interconnects such as DVI, carry one pixel data per link character clock. A further discussion of data rates transmitted through the link is contained in the paragraphs below.

In this way, the system 300 provides a scaleable medium for the transport of not only video and graphics data, but also audio and other application data as may be required. In addition, the invention supports hot-plug event detection and can automatically set each channel (or pipe) to its optimum transmission rate.

Thus, a main link (such as treated in 422 of FIG. 4 below) can include one or a plurality of data channels. Each channel capable of simultaneously transmitting multiple isochronous data streams (such as multiple video/graphics streams and multi-channel audio streams. Accordingly, a main link can include a number of different virtual pipes, each capable of transferring isochronous data streams (such as uncompressed graphics/video and audio data) at multiple gigabits per second (Gbps). From a logical viewpoint, therefore, each channel of the main link appears as a single channel with possibly many virtual pipes established. In this way, each data stream is carried in its own logical pipe.

It should be noted that the main link can comprise a plurality of discreet channels and may have adjustable properties. For example, the speed, or transfer rate, of the main link can be adjusted to compensate for link conditions. In one implementation, the speed of each channel of the main link can be adjusted in approximately 0.4 Gbps increments. At maximum throughput, the link can transmit about 2.7 Gbps per channel. Additionally, in one embodiment, the main link can include 1, 2, or 4 main channels. In one example, by setting the number of channels to four, the main link 422 can support WQSXGA (3200×1028 image resolution) with a color depth of 24-bits per pixel at 60 Hz. or QSXGA (2560× 1028) with a color depth of 18-bits per pixel at 60 Hz, without data compression. Even at the lowest rate of 1.62 Gbps per channel, only two channels are required to support an uncompressed HDTV (i.e., 1080i or 720p) data stream.

In addition to providing video and graphics data, display timing information can be embedded in the digital stream providing essentially perfect and instant display alignment. The packet based nature of the inventive interface provides scalability to support multiple, digital data streams such as multiple video/graphics streams and audio streams for multimedia applications. In addition, a universal serial bus (USB) transport for peripheral attachment and display control can be provided without the need for additional cabling.

Figure 4:
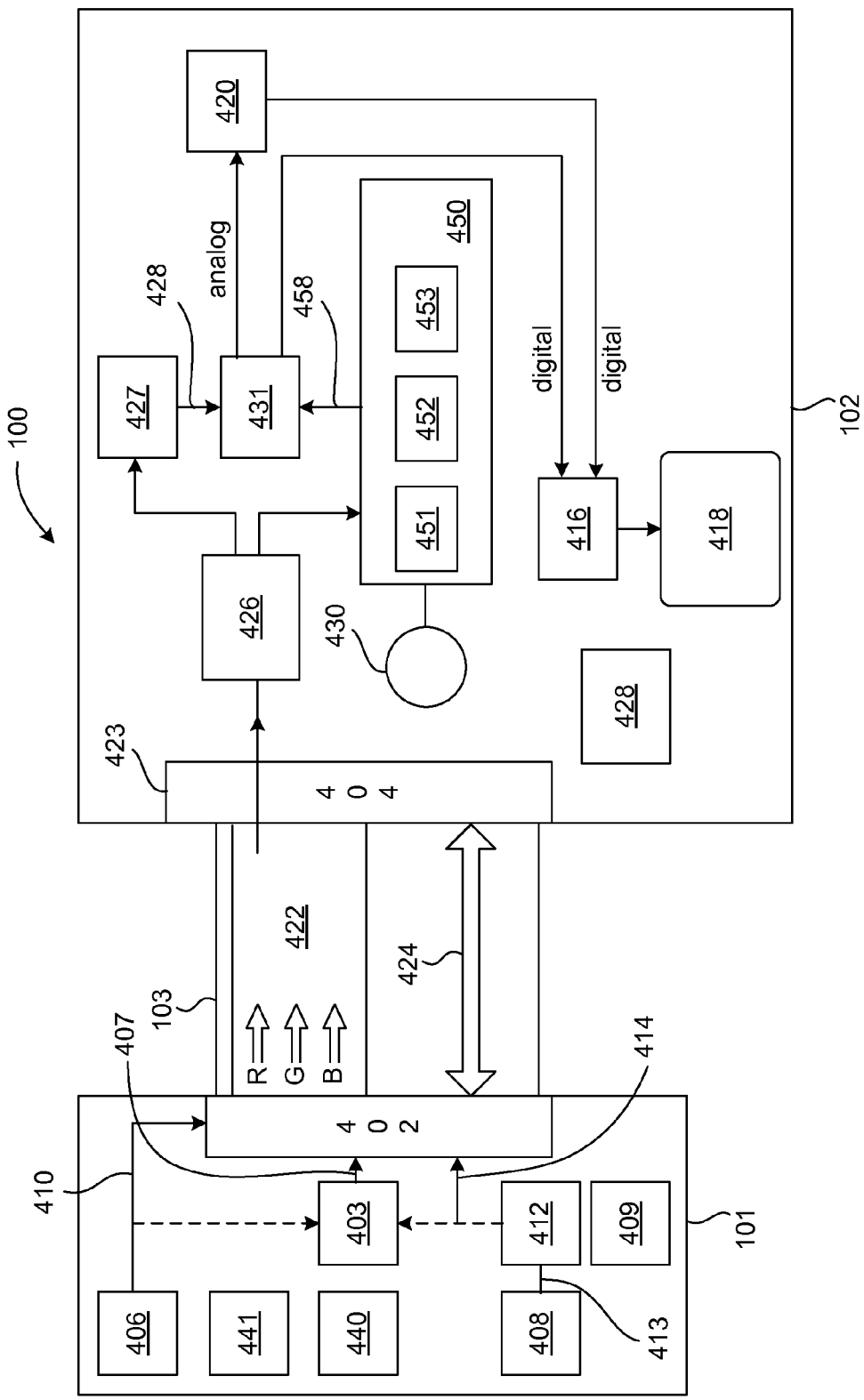
FIG. 4 is a generalized network diagram showing a sink device in communication with a source device via a data link in accordance with the principles of the invention.
Figure 5:
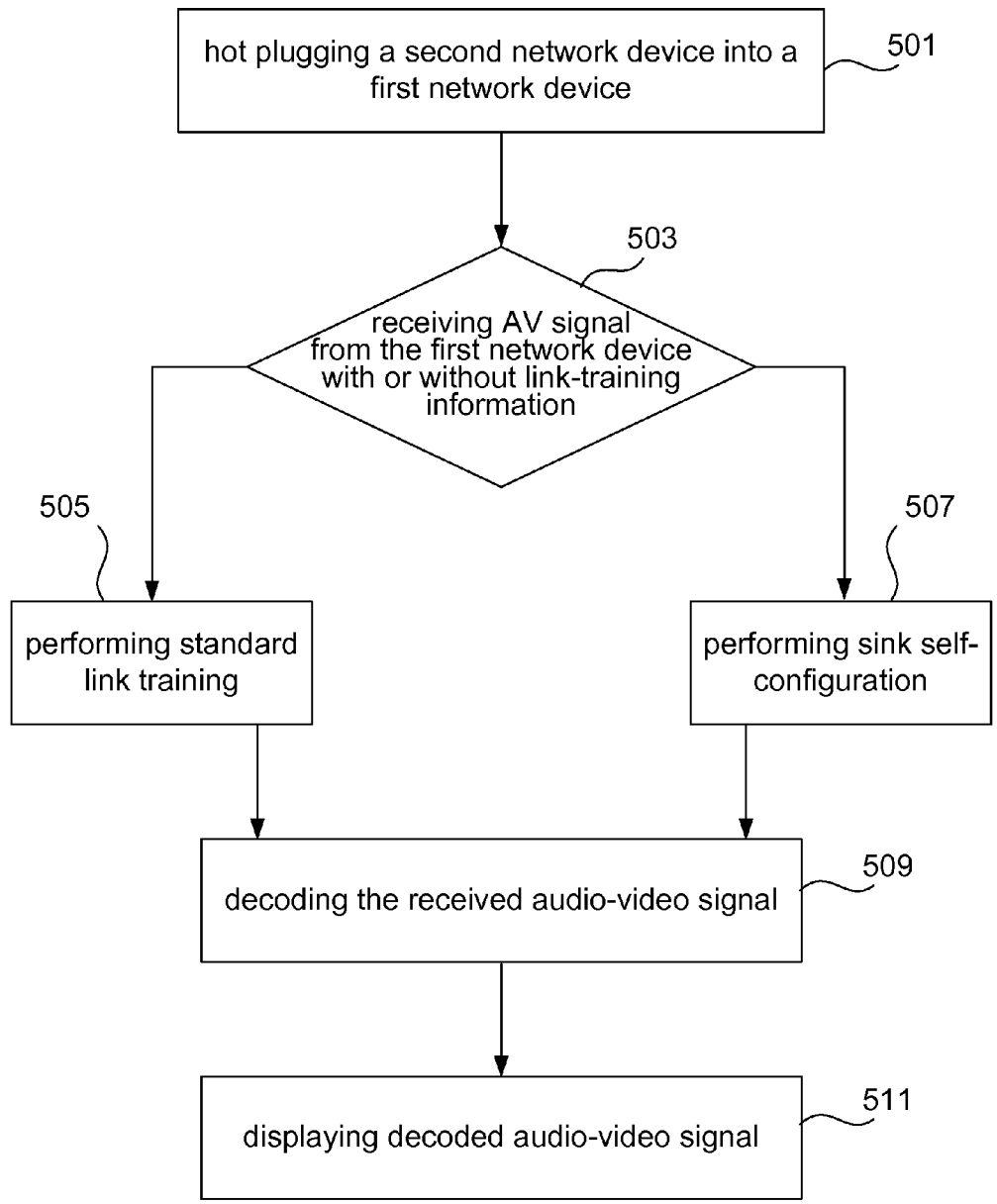
FIG. 5 is a flow diagram illustrating one approach to handling hot plug events in a multi-media network in accordance with the principles of the invention.

The context of embodiments of the invention is further explained with reference to FIG. 4. FIG. 4 is another simplified view of the system 100 shown in FIG. 1 that is used to connect an audio-video source 101 and an audio-video display unit 102. The network source 101 is in communication with network sink 102 via a data link 103 of a type described in FIG. 3 about and explained in greater detail in, for example, in U.S. patent application Ser. No. 10/726,794 entitled "PACKET BASED VIDEO DISPLAY INTERFACE AND METHODS OF USE THEREOF" filed Dec. 2, 2003 and hereby incorporated by reference herein for all purposes.

Referring again to FIG. 4, the source 101 can, for example, include either or both a digital multimedia source 406 and an analog multimedia source 408. In the case of the digital source 406, the content (a digital data stream) 410 is provided to the transmitter 402 which is interfaced with the data link 103. Typically, the transmitter comprises a data interface enabling communication with another network device through the data link 103. In the case of the analog video source 408, an A/D converter unit 412 converts an analog data stream 413 to a corresponding digital data stream 414. Alternatively or additionally, the source 101 can include an encoder 403 arranged to encode the data 410, 414 received from the source 406 or 408. For example, the encoder 403 can convert an eight bit digital data stream 410 (or 414) into a 10 bit data stream 407 in accordance with an ANSI standard 8B/10B encoding scheme. This 8B/10B encoded data is communicated to the sink 102 through the data link 103. As is appreciated by those of ordinary skill said data can be encoding in accord with a number of different schemes. It is also pointed out that the function of encoder 403 can be integrated into convertor 412 which can also receive and encode digital signal 410 in such embodiments. In such case both the converted digital data stream 414 and the digital data stream 410 can be encoded 403, output as an encoded data stream 407. In any case, streams 407, 410, 414 can all be processed similarly by the transmitter 402 and then transmitted through the data link 103.

The source 101 can further include link training circuitry 440 configured to generate link training information associated with the content (e.g., one of 407, 410, 414) to be transmitted to receiving devices. This information can include, but is not limited to clock information, timing information, test and training data patterns, handshake information, and numerous other pieces of information necessary or helpful in configuring a receiver to properly present the content transmitted. Commonly, such configuration and handshaking information is transmitted to a receiving network device via an auxiliary channel 424 of said data link 103. In most cases the configuration (link training) information enables the receiver to reconstruct the audio-video signal.

Additionally, the source 101 can include hot plug detection circuitry 409 configured to receive hot plug detect messages from the receiving network device 102 when it is hot plugged into the network. In one implementation, such hot plug information is transmitted and received via the auxiliary channel 424 of said data link 103. In some embodiments, the hot plug detection circuitry 409 can be equipped with a toggle that can be turned off or on. For example, when the toggle is switched "on", the hot plug detection circuitry detects hot plug events when other devices are connected to the source 101 in hot plug events. In such a situation the source 101 can send link training information along with transmitted data. When the toggle is switched off, the hot plug detection circuitry 409 does not detect hot plug events and therefore sends the audio-video signal without sending associated link training information.

Also, if desired the source 101 can further include a power saving module 441 configured to send power control messages to associated network devices connected with the source. For example, after some preset time period the source can send a message to a sink instructing it to power down some or all of its systems and/or sub-systems to save power until such time as the system has need of it. Many different implementations of this embodiment are contemplated by the inventors. Commonly, such power save information is transmitted to a receiving network device via the auxiliary channel 424 of said data link 103.

In some embodiments, the source 101 can be configured to include a default transmission mode. As a reminder, in one particular embodiment, data can be transmitted through 1, 2, or 4 channels of the main link 422 and generally at a minimum bit rate of about 1.62 Gbps to a maximum of 2.7 Gbps per channel. It should be noted that the source 101 can be configured to transmit network content in a simplified default mode. The default mode involves transmitting data over a single data channel (even when more than one channel is available) and at a lowest available bit rate. For example, the default mode can transmit data through a first data channel ($L_0$) and at a at reduced bit rate (RBR) of 1.62 Gbps. This default mode can be used by a sink device to conduct self-configuration to overcome a lack of link-training information. This is discussed in greater detail below. In any case, in implementations where the default rate is known by the sink device, the default mode significantly reduces the complexity of the self-configuration process and therefore increases the speed of the process.

The content is then transmitted through the data link 103 to the sink device 102 where it received as a stream of audio-video data (an audio-video signal) 423 that can be decoded, displayed, used, or otherwise consumed. In this further description, the sink will be described as a display device (but is expressly not limited to such). The sink device 102 receives the transmitted network content through the sink interface 404 of the data link 103 as a data stream.

Upon the hot plugging of the sink 102, the sink can send a hot plug detect (HPD) message to the source device such that the source 101 becomes aware that a hot plug event has occurred. For example, the HPD message can be sent by HPD messaging circuitry 428 through said auxiliary channel 424 of the link 103. Accordingly, the auxiliary channel can enable a sink 102 to send the HPD message to the source 101 upon connection and power up of the sink device 102. The source 102 receives 409 the hot detect message and responds to it in one of a number of ways described herein.

When an HPD message is received, recognized, and processed at the source, under the correct conditions, the source can acknowledge receipt of the HPD message. Typically, this comes in the form of data messages containing link training information concerning the transmitted audio-video signal which can be transmitted to the sink using the auxiliary channel 424. As will be described herein, under some conditions the sink will not send a HPD message and also under some conditions the source will not receive, detect, or recognize, an HPD signal sent by the sink (such as events $x_1$ and $x_2$ of FIG. 2A). An important aspect of the invention describes how the system deals with these types of events.

To continue, the received audio-video signal 423 can be input into link communication circuitry 426 that determines whether the audio-video signal 423 has associated link training information or is received without the link training information. Where the link training information is provided in association with an audio-video signal, the link training information is processed by circuitry 427 designated for reconstruction of the signal based on source generated link training information. For example, circuitry 427 can include a time base recovery unit that enables the reconstruction of the signal 423 after the circuitry performs a standard link training protocol to configure the sink enable reconstruction of the data steam of the audio-video signal. Such link training protocols are known to persons of ordinary skill in the art.

In the absence of link training information the signal 423 can be reconstructed using characteristics of the received audio-video signal itself and the local clock 430 of device 102. Thus, when audio-video signal 423 is received without associated link training information, the audio-video signal is processed by self-configuration circuitry 450 to reconstruct the data stream of the received audio-video signal.

Figure 9:
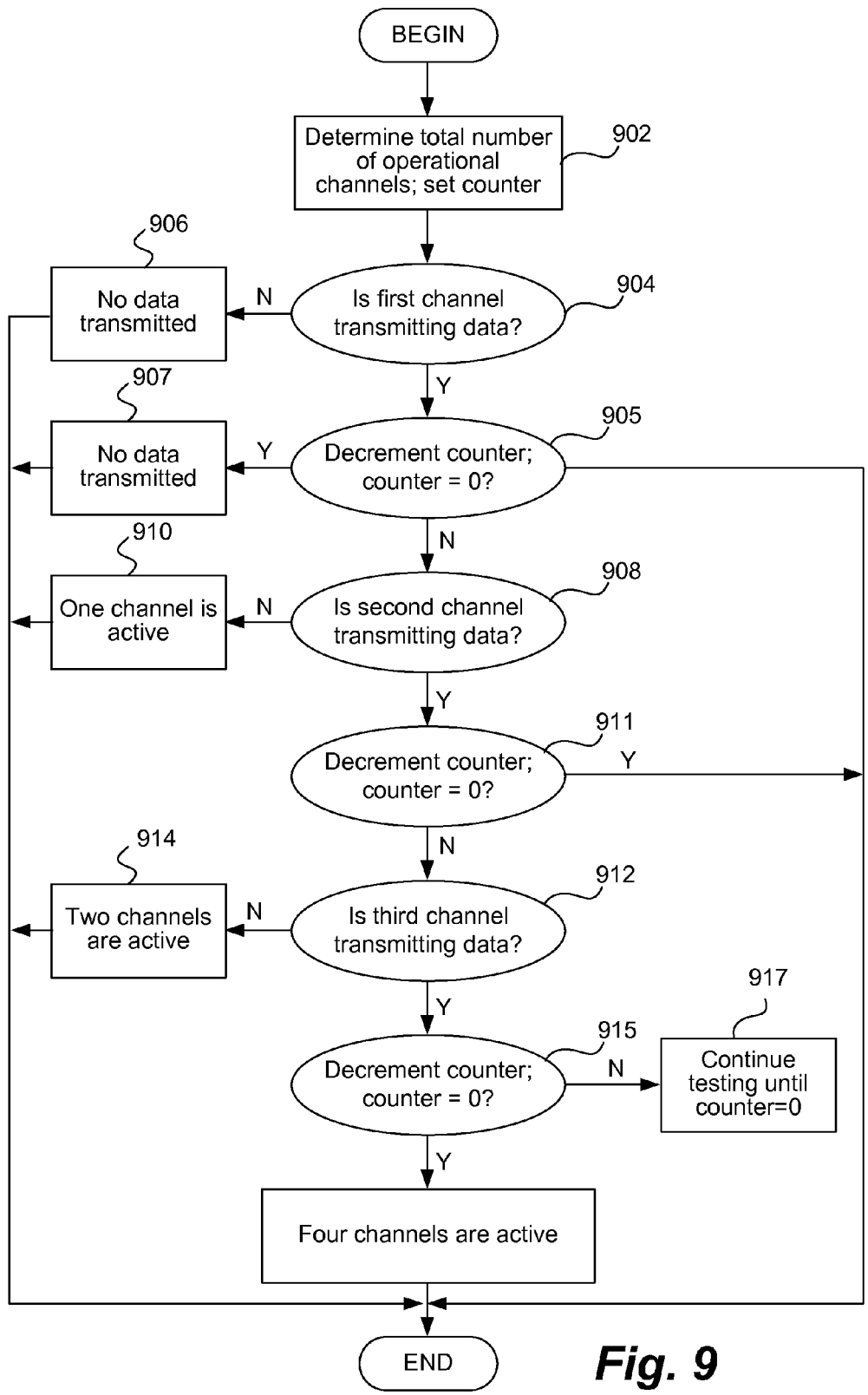
FIG. 9 is a flow diagram illustrating a process of sequentially or serially testing the channels to determine which are being used in accordance with one embodiment.
Figure 10:
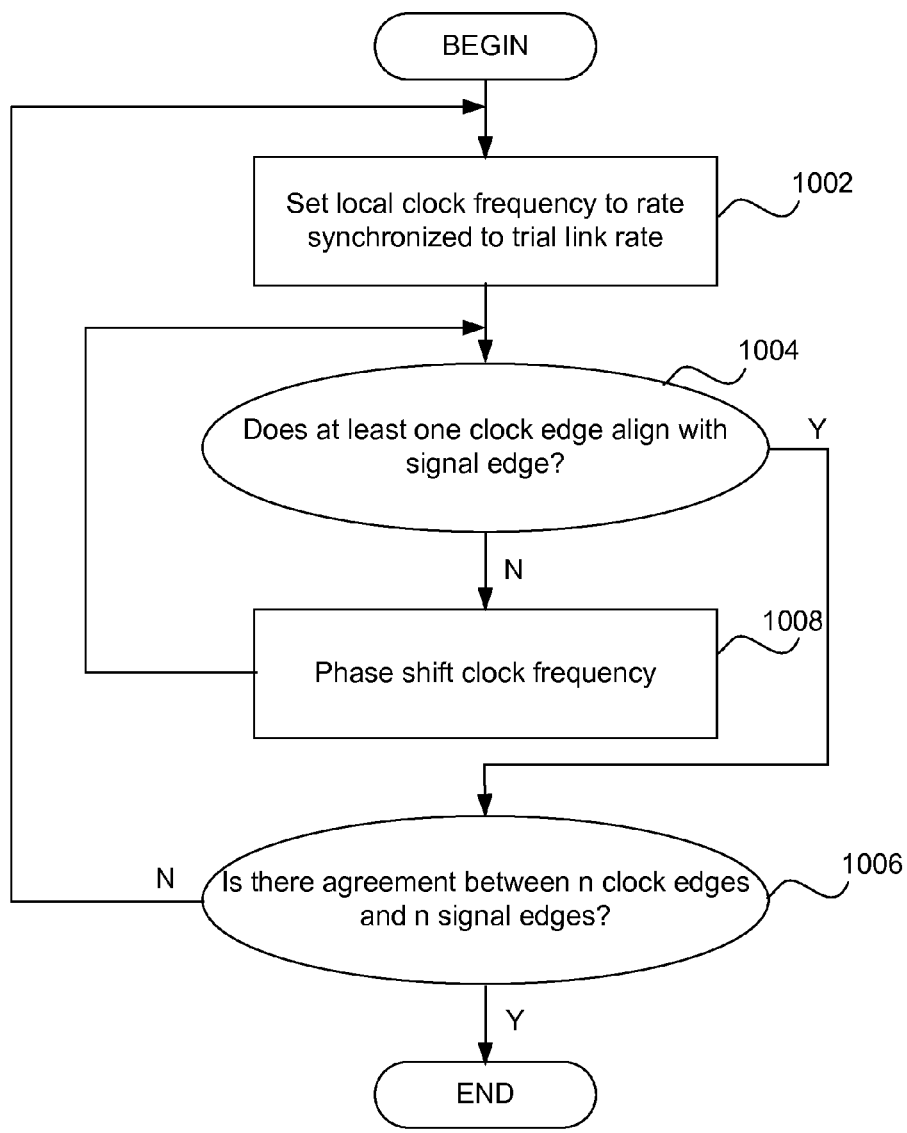
FIG. 10 is a flow diagram illustrating a process of checking the signal frequency and locking the signal frequency with the local clock frequency in accordance with one embodiment of the present invention.
Figure 11A:
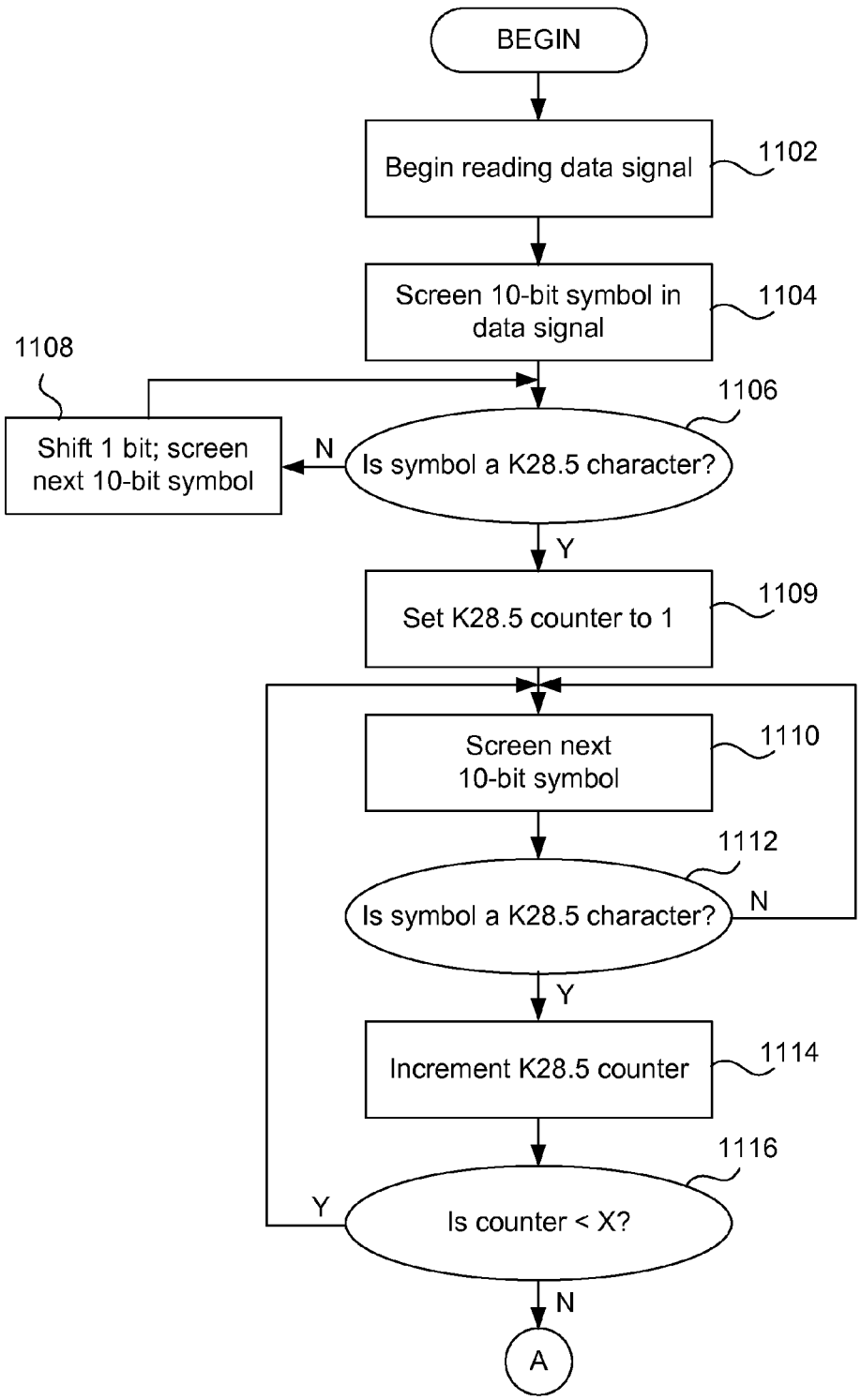
FIGS. 11A and 11B are a flow diagram illustrating a process of symbol boundary identification and symbol synchronization in accordance with one embodiment.
Figure 11B:
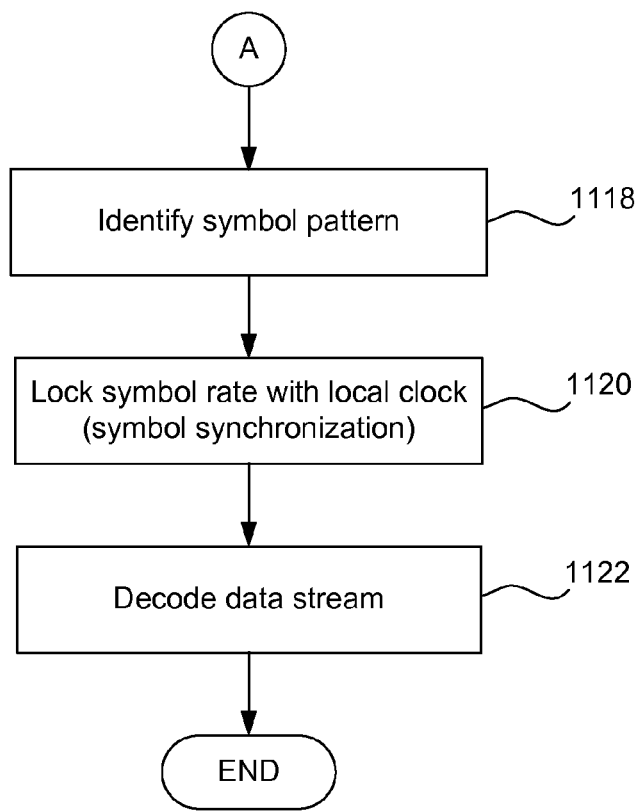

The self-configuration circuitry 450 works in conjunction with a local clock 430 of the device 102 to enable self-configuration of the device 102 to stabilize and correctly interpret the received data 423. This enables the original signal to be reconstructed from the packetized data stream received from the source 101. This signal 423 is frequency and symbol locked with a local clock 430 (in processes explained in detail below) and then decoded for further processing or display. The frequency and symbol locking is the result of processes which, in one embodiment, are each performed separately by modules 451, 452, and 453. Module 451 may be referred to as an active-channel utilization module or circuitry for determining the number of channels or lanes being used to carry signal 423. Module 452 is frequency setting circuitry for local clock 430 used for setting the local clock frequency to a clock rate synchronized to one of the known link rates. Module 453 is the symbol locking circuitry that identifies symbol boundaries and performs the symbol locking or synchronization. These modules, which comprise self-configuration circuitry 450, are shown in greater detail in FIG. 12. FIGS. 9, 10, and 11 are flow diagrams illustrating processes for enabling receiver (sink) self-configuration and make reference to components and modules shown in FIG. 12.

The reconstructed signals (either 428 Or 458) are then processed by a decoder 431 to decode the received signal and convert to any desired format. Typically, said decoding involves a conversion to a format displayable by display 418. In one particular embodiment, the decoder 431 receives network content 423 from the main link 422 encoded on an 8B/10B format. The 10 bit symbols are decoded and converted back to native 8 bit signals and then forwarded for further processing or display 418. In the case of digital content, the decoded data stream is forwarded to display interface 416 where it is configured for display by display media 418. Additionally, where required, the decoded data stream is forwarded to digital to analog convertor 420 where it is reconfigured as an analog signal and then forwarded to display interface 416 where it is configured for display by display media 418. Although not required, in some embodiments, the display media 418 is an integral component of the sink device 102.

As indicated above, an important aspect of the invention is directed to methods and systems enabling the data to be displayed at the sink in the absence of link configuration information. Referring now to the flow diagram of FIG. 5 and system diagram FIG. 4, an embodiment of a method of communicating audio-video data between devices in a multimedia network is described.

The process is briefly described as follows. A suitable process begins with an operation of hot plugging a second device into an active first network device via a data link (Step 501). Such a hot plug event is as described previously. For example a powered sink device 102 (e.g., a display device) is plugged into a powered source device 101 (e.g., a computer device). In an alternative example, said devices are already connected and unpowered sink device 102 switched on (e.g., at time $t_1$).

In response to the hot plug event, the second network device 102 (e.g., a sink) provides a hot plug detect message (HPD message) to the first network device (e.g., the source). In the architecture described herein, such an HPD message is sent from sink 102 to source 101 through a bi-directional auxiliary channel 424 of the data link 103. Also, it should be pointed out that some embodiments of the network devices 101, 102 can be configured with a hot plug messaging toggle 428 on the receiver 102 (or alternatively the HPD (See, FIG. 4) that can be switched to an on or off position. The off position indicating that no HPD messages are sent by the device until the toggle is switched into the on configuration which allows HPD messaging. Also, the inventors contemplate network devices 102 that do not have HPD messaging capability at all. In the absence of such capability or in a toggle "off" configuration the sink device 102 does not send HPD messages. When the sink 102 is configured appropriately, the device will send at least one HPD message in response to the hot plug event. As an aside, the inventors point out that the hot plug detection circuitry 409 can also be toggled to selectively receive HPD messages or not.

The process embodiment disclosed herein can accommodate both devices that do, or do not, send HPD messages. The next operation is one of receiving network content at said second network device after the hot plug event (Step 503). Thus, the source 101 sends network content whether or not a HPD message is sent by the sink 102 or not. Moreover, the source 101 sends network content whether or not the source 101 receives and recognizes the HPD message.

An important attribute of the invention is that the source sends the data in one of a finite number of configurations. To begin, the embodiment sends data at one of two link rates comprising known bit rates. For example, the data link rates are either a reduced bit rate (RBR) of 1.62 Gbps or at a high bit rate of 2.7 Gbps. Thus, the data is sent at one of a finite number of bit rates. Here, we have two standardized bit rates.

Also, the data is sent over a finite number of channels, 1, 2, or 4 channels. Thus, in the foregoing circumstance, the data is received in one of six possible modes (two different bit rates over three possible channel combinations). Of course the number of bit rates and channel combinations can be adjusted to accommodate different or improved technologies, but the basic idea is that a finite number of channel and bit rate combinations are used to transmit the data stream in one of a finite number of transmission modes. In one embodiment, the data is sent in a serial data stream compliant with the Serial Advanced Technology Attachment standard (SATA) in accordance with the specifications set forth by the SATA-IO.

Additionally, the invention contemplates a "default" data transmission mode for the source described above. In particular, the default mode can be very useful as a mode of operation for networks having more primitive receivers. Thus, when a source device does not receive and recognize HPD messages from a sink device it sends data in a default mode. In one particular default mode, the data is sent a RBR (1.62 Gbps) through a single data channel. Accordingly, the data is received at the sink device 102 in a SATA data stream through one channel (for example a default first channel $L_0$) at the lowest available bit rate. Under such conditions, the receiving device will have little difficulty in handling the signal. However, in a more general case, the data is transmitted in one of a small number of finite transmission modes. In this embodiment, at one or two different link rates (1.62 Gbps or 2.7 Gbps) over 1, 2, or 4 channels.

The source device can respond differently to the received data depending on whether associated link training information is also provided. Whether said link training information is provided can depend on a number of factors. For example, when or if the HPD message is received at the source or what toggle configuration is being used. For event $x_0$ the standard VBIOS start up routine can institute a link training that will enable the device 102 to receive and symbol and frequency lock the data with the display local clock, and display the data based on transmitted link training information from the source. For event $x_3$ the operating system in conjunction with the appropriate device drivers can institute a link training that will enable the device 102 to receive, symbol and frequency lock the data with the display local clock, and display the data also based on transmitted link training information from the source. In response to events $x_1$ and $x_2$, a somewhat different approach may be taken.

Referring to the condition described in FIG. 2A at event $x_1$ a hot plug event occurs prior to operating system booting begins (prior to $t_2$). Accordingly, the VBIOS operates to deal with link state changes and interrupts. Importantly, during the period 201 the source 101 does recognize HPD messages and so cannot provide link training information as required to conduct standard configuration of the sink 102. Thus, multimedia data sent by source 101 arrives at sink 102 but because the sink has not be properly configured it arrives without being provided the associated link training information. Therefore the sink 102 is not configured to display the content. The same can be said for a event $x_2$ type event.

At this point one of two actions are taken. The sink device 101 has received, depending on the source device 102 response to the hot plug event, either (i) link training information AND network content from the source device 101 or (ii) network content from the source device 101, WITHOUT said link training information. As to instance (i), most typically, such events occur before $t_1$ and after $t_3$ (of FIG. 2A). Commonly, in such conditions the source 101 is capable of receiving, recognizing, and responding to HPD messages from the sink 102. In accordance, the source provides link training information to the source that can be used to configure the sink and data link to receive data. This leads to standard link training (Step 505). Alternatively, in instance (ii), the sink device 102 receives the network content without said link training information. This can be due to a variety of different conditions but can occur when the source 101 is unable to receive and recognize HPD messages sent by the sink after a hot plug event and no acknowledgment or handshaking occurs with the sink. This signals to the sink 101 that local self training should be performed (Step 507). Type (ii) instances generally occur when hot plug events (in this case events $x_1$, $x_2$ of FIG. 2A) occur prior to OS set up (in time periods 201, 202, prior to $t_3$) or when the source fails to send link training information for other reasons. Because during this time period, the source does not handle interrupt events (such as hot plug events) well. The present invention includes methods for getting around the difficulties in the present art.

In Step 505, the sink device selectively performs device configuration based on the information received in the preceding step. In the case (i) where link training information is provided to the sink 102 by the source, the sink uses this information perform link configuration. In ordinary link training, the link training information is transmitted to the sink via the auxiliary line 424. This link training information can include information including, but not limited to, number of channels operational and transmitting data, symbol boundary information, timing information, link rates, test patterns used to stabilize the link as well as other information. Any one of a number of link training processes can be used to operate upon this information to provide a stable and accurate data link. A particular methodology that may be used is that set forth in U.S. patent application Ser. No. 10/726,794 entitled "PACKET BASED VIDEO DISPLAY INTERFACE AND METHODS OF USE THEREOF" filed Dec. 2, 2003.

Link Self Configuration

Figure 6:
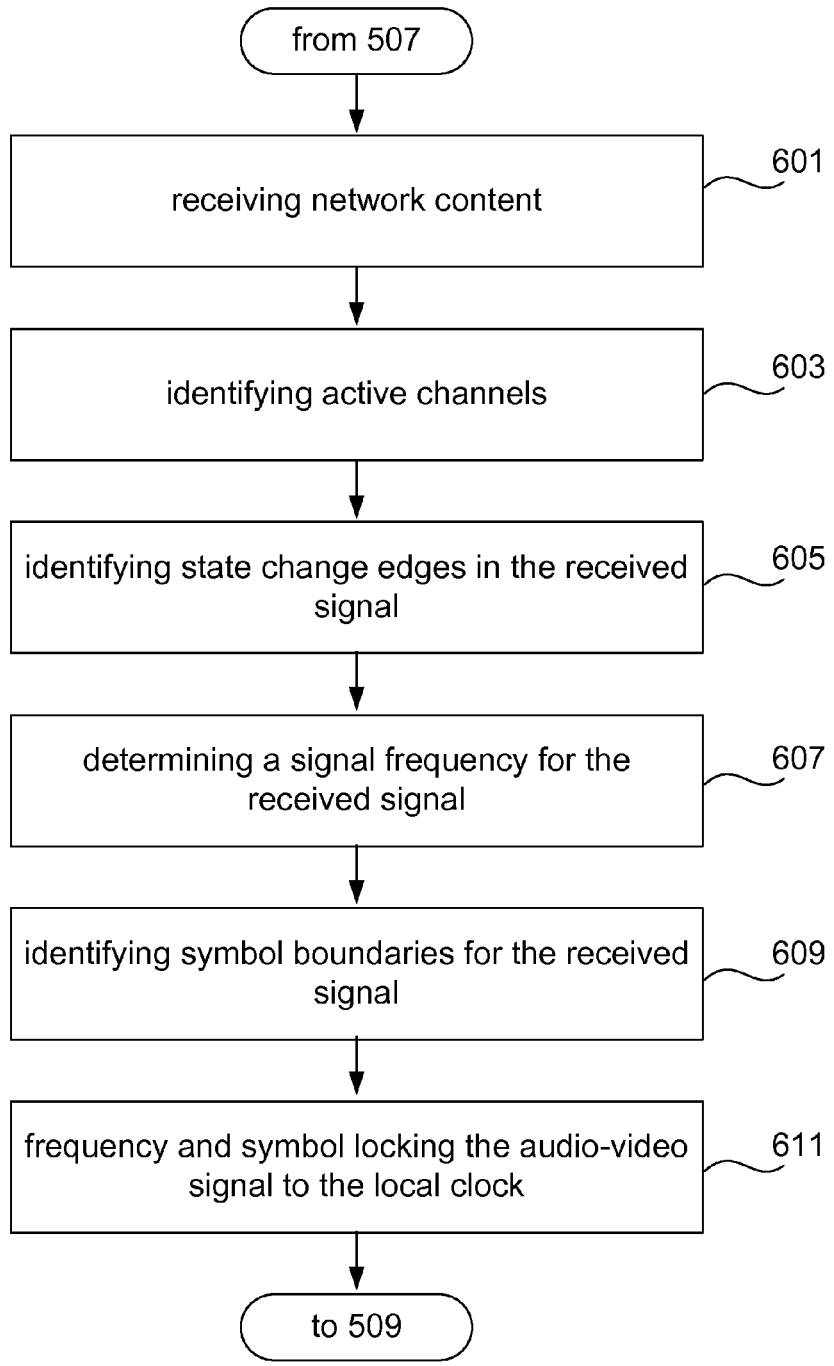
FIG. 6 is a flow diagram illustrating one approach conducting link self-configuration in response to hot plug events in a multi-media network.

When the sink performs self-configuration (Step 507), for example, in instance of type (ii) where no link configuration data is provided by the source, the sink device 102 will perform "self-training" to configure the system to receive and display data from the source. FIG. 6 is a flow diagram illustrating one process for conducting self-configuration of the sink 102 to receive data from the source 101.

Such a process begins with the sink 102 receiving network content from the source (Step 601). Referring to the highly simplified diagram of FIG. 2B, a system 100 having a sink device 102 in communication with a source device 101 through a data link 103 is depicted. In this depiction, the link 103 is shown with four data channels ($L_0$, $L_1$, $L_2$, $L_3$). The sink 102 is able to receive data through all available channels (here four). As shown in this example, data ($I_0$, $I_1$) is input into two channels ($L_0$, $L_1$).

Figure 12:
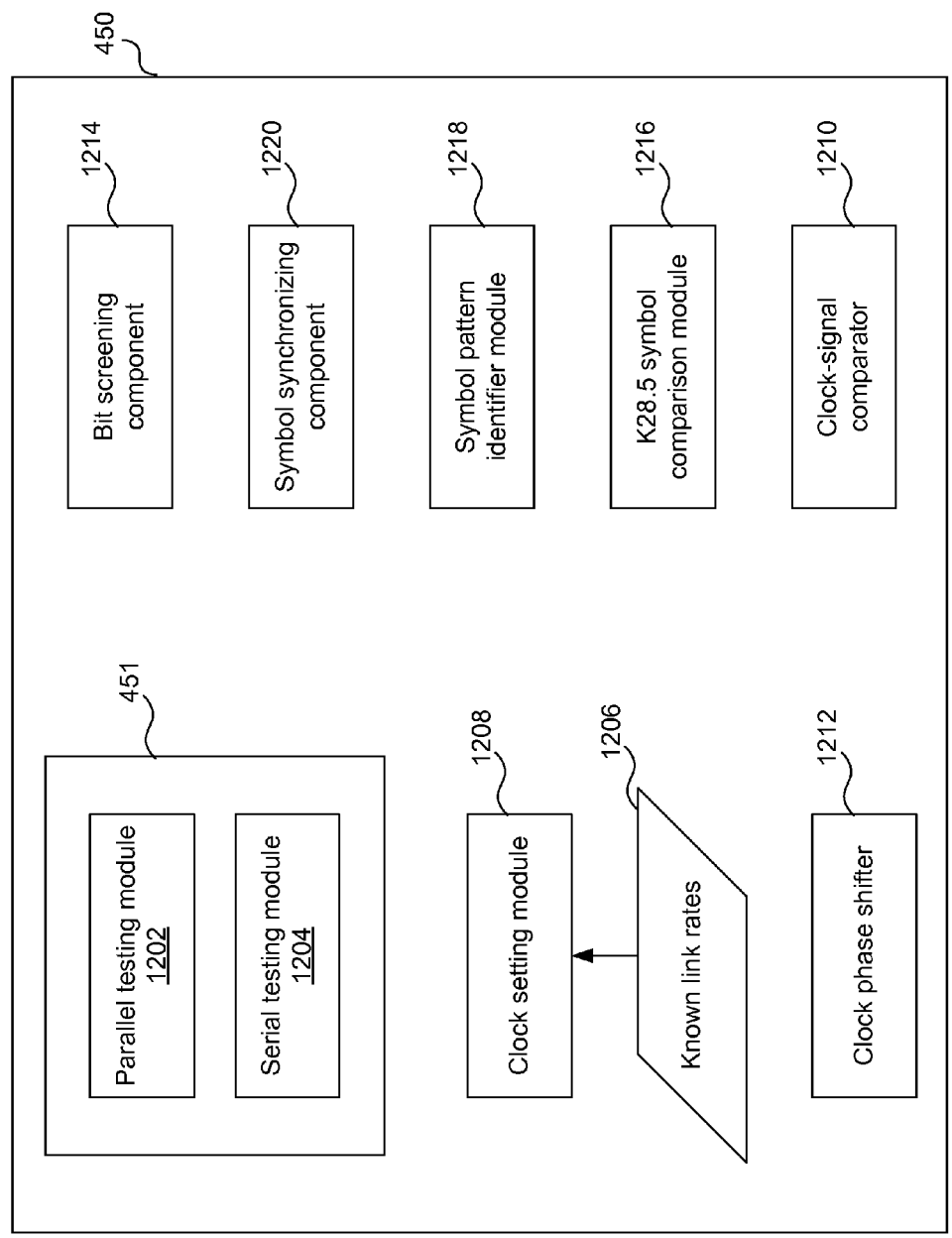
FIG. 12 is a block diagram showing components and modules of a link self-configuration circuit module in accordance with one embodiment of the present invention.

The sink will then determine how many channels are sending data (Step 603) using active-channel determination circuitry 451 shown in FIG. 4. This can be accomplished using any of a number of methods. In a preferred embodiment, since each channel typically has its own circuit, all channels are tested in parallel; each circuit is tested at the same time to see which ones are sending data. In this embodiment, the number of channels being used is determined one test. Referring to FIG. 12, a detailed block diagram of self-configuration circuitry 450 is shown. Active-channel module 451 is shown as having two modules. The parallel testing of all the channels is performed by parallel testing module or circuitry 1202. In another embodiment, the channels are tested sequentially. This sequential testing mode is a useful alternative to have available to the sink 102 where for whatever reason the channels cannot be tested in parallel. In common usage the channels are filled by the source from lowest to highest. Thus, in one example, the sink 102 will simply test each of the channels in a sequential pattern.

FIG. 9 is a flow diagram of a process of sequentially or serially testing the channels to determine which are being used in accordance with one embodiment. At step 902 the sink 102 determines the total number of operational channels in link 103. A counter is set to this number of potentially operative lanes. If there are four channels, according to normal practice, either 1, 2, or 4 channels are used (that is, if $L_2$ is used, the fourth lane, $L_3$ is also used). Use of a counter is optional. It is shown here to describe one possible implementation. In the described embodiment, it is used to determine whether all the lanes have been tested. In other embodiments, module 1204 can simply see if there are more lanes. In the example above, there are four channels or lanes that may be operational. In other embodiments, there may be more or fewer operational lanes. At step 904 the first channel, $L_0$ is tested to see if data is being sent. If no data is received over this channel, the sink 102 knows that no data is being received from the source at which point, at step 906, the process is complete.

If there is data on $L_0$, control goes to step 905 where the counter is decremented by one and then checked to see if it is zero. If it is zero, indicating there are no more lanes, there is no data transmitted and the process is complete at step 907. In this scenario there was only one operational channel. If the counter is not zero, at step 908 the sink then determines whether a second channel, $L_1$ is transmitting data. If data is not being received over this channel, control goes to step 910 where the sink has determined that data is only being received over channel, $L_0$. If data is being received over the second channel, $L_1$ control goes to step 911 where the counter is decremented by one and is checked to see if it zero. If it is zero (i.e., there were only two operational lanes), the process is complete. If it is not, control goes to step 912 where a third channel, $L_2$, is tested. If data is not being received over $L_2$, the sink 102 has determined that only two channels are sending data at step 914 and the process is complete.

If the third channel, $L_2$, is sending data, the counter is decremented and tested to see if it is zero. In the example where there are four channels and the counter was set to three because typically either 1, 2 or 4 channels are in use, the counter is now zero. As noted, if the third channel, $L_2$, is being used, then, based on common practice, the fourth channel, $L_3$ is being used. At step 916 the sink has determined that all four channels or lanes are being used to send data. Thus, the sink 102 has determined using an alternative sequential testing method, which lanes are being used for transmitting data. As noted above, this data would normally be transmitted as one of the data components of the link training data. With reference to FIG. 12, this sequential or serial testing process is performed by serial testing module 1204 within active-channel utilization module 451. In sum, module 1204 in the sink 102 may test $L_0$ first, if no data is received from $L_0$, the sink 102 is aware that no data is being sent. If data is received through $L_0$, the sink 102 is aware that that at least $L_0$ is active and will then test $L_1$, if no data is received from $L_1$, the sink 102 is aware that data is being sent through $L_0$ alone. If data is received through $L_1$, the sink 102 is aware that that at least $L_0$ and $L_1$ are is active and will then test $L_2$. If data is received through $L_2$, the sink 102 is aware that that at least at least $L_0$, $L_1$ and $L_2$ (and, in accord with most schemes, $L_3$ as well) are active, and if no data is received from $L_2$, the sink 102 is aware that data is being sent through $L_0$ and $L_1$ alone.

This process is facilitated when the source is in a default data transmission mode transmitting data through a single channel $L_0$ of the data link 103 at a reduced bit rate (e.g., 1.62 Gbps).

Once it is determined how many active channels there are, the data is then examined to identify the bit rate at which the data is being sent through the link 103 and frequency lock this bit rate with the local clock frequency of the sink. In particular, the data is examined to identify state transitions ("edges") in the received data (Step 605). This process can be illustrated with reference to FIG. 7A.

Figure 7A:
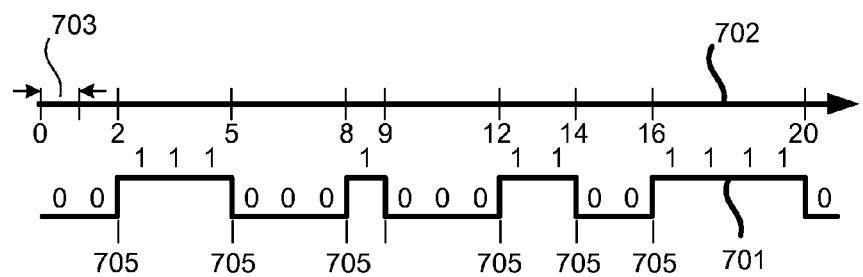
FIGS. 7A and 7B are timing diagrams illustrating processes for frequency determination and frequency locking in accordance with the principles of the invention.

FIG. 7A depicts a data stream state diagram 701 useful in illustrating the identification of transition state edges in a data stream associated with received audio-video signal. Also, an associated time line 702 is shown. The data signal 701 depicted here is an 8B/10B signal. As is known, such 8B/10B signals are encoded in accord with a number of parameters specified by the 8B/10B standard. FIG. 7A shows a timing diagram identifying a sequential stream 702 of bit periods 703 associated with the 8B/10B signal 701. The data signal 701 is encoded as a string of ones and zeroes sent over the data link 103. As depicted here the "0" or "1" values of each data bit in the signal 701 are shown. Whenever the data stream makes a transition from "0" state to a "1" state or vice versa, a transition state "edge" 705 is defined. Due to the nature of 8B/10B encoding such transitions or "edges" occur with relative regularity in 8B/10B encoded streams. Here the "edges" 705 are shown at the indicated (at the bit periods 2, 5, 8, 9, 12, 14, 16 and 20). These edges 705 can be used to identify and lock the signal transmission frequency (or data link rate) with the local clock frequency of the sink device.

Once the sink identifies edges 705 for the signal (at Step 605), the sink determines a signal-based clock frequency associated with the received data stream (Step 607). One embodiment for enabling such a process is described as follows.

To begin, a relatively fast clock 430 having a stable frequency is required. Typically, the local clock 430 is chosen such that it has a high degree of stability and accuracy and a clock frequency fast enough to match the bit rate of the data transmitted through the link 103 at the highest possible link rate. Clocks having sufficient stability are clocks having a frequency variance of less than about 3%, with clocks having a frequency variance of 1% or less being more preferred. Generally, crystal oscillators such as quartz oscillators have the required stability properties to enable the invention. Moreover, a clock having a clock frequency of at least 27 MHz is generally preferred as being sufficient to process 2.7 Gbps link rates. The clock 430 is used together with the self-configuration circuitry 450 to generate a signal-based clock frequency for the received data and lock that frequency to the local clock frequency.

As explained previously, the data stream is transmitted at one of a finite number of data rates (see "known link" 1206 in FIG. 12). In one particularly pertinent example, the data stream is transmitted through the link at a link rate of either 1.62 Gbps or 2.7 Gbps. In order to check the signal frequency and lock the signal frequency with the local clock frequency, the process described in FIG. 10 is used and may be implemented using local clock frequency setting circuitry 452. At step 1002 of FIG. 10, the a local clock frequency is set initially to a trial clock rate synchronized to one of the known link rates, such as 1.62 GHz and 2.7 GHz (there may only be one or more than two) These known trial link rates are shown as data component 1206 in FIG. 12. They are shown as input to a clock frequency setting component 1208 which performs the function of step 1002. In this case, the local clock is set to a first of the two possible frequencies. In this example, the local clock is set to the lower frequency (i.e., set with a clock period that can resolve a 1.62 Gbps signal (a clock frequency set to about 16.2 MHz data stream. This is advantageous because if the signal is being set at a default rate, this slower clock rate will be set at the default rate. In any case, a first one of the finite clock frequencies is set at the local clock.

At step 1004 the sink 102 determines whether at least one local clock state transition or "edge" is aligned with an incoming signal edge. This is performed by a comparison module 1210 that is able to compare the local clock frequency with the received signal specifically by examining edge alignment. If there happens to be alignment of at least one local clock edge with a received signal edge upon initial frequency setting, control goes to step 1006 where it is determined whether there is acceptable agreement between a minimum number n of local clock edges and n number of received signal edges (described below). If there is, then the process of setting the local clock frequency to the incoming data signal frequency is complete. However, in most cases it is unlikely that there will be immediate alignment between local clock edges and incoming signal edges by virtue of the first frequency setting. If at step 1004 there is no alignment between a local clock edge and a received signal edge, control goes to step 1008 where the local clock frequency is phase shifted. This is performed by a local clock frequency phase shifting module 1212. In one embodiment, components 1206, 1208, 1210, and 1212 are part of local clock frequency setting circuitry 452.

Figure 7B:
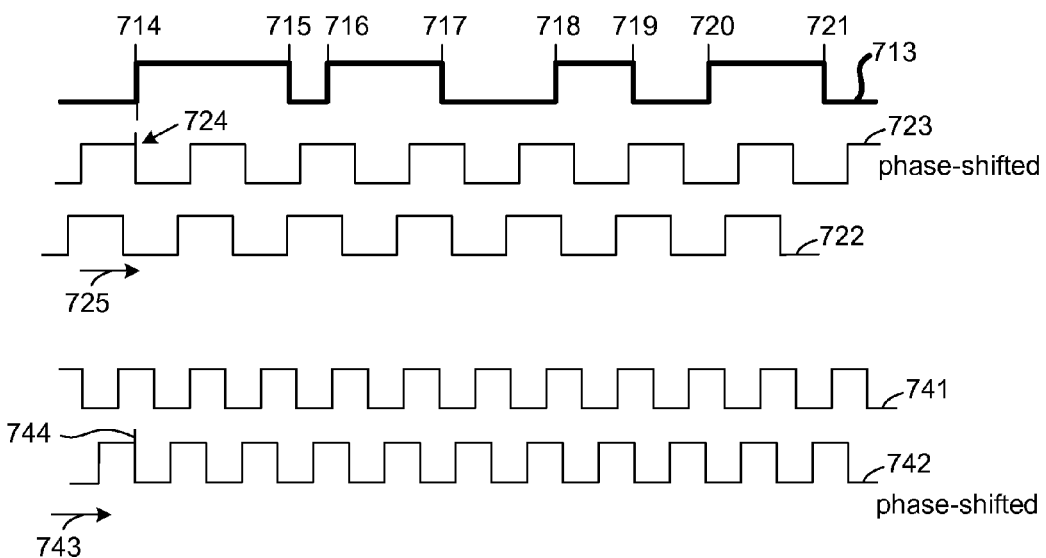

FIG. 7B provides an illustration of this principle. A first clock signal 722 (corresponding to a first frequency) is provided by the local clock 430 and then is phase shifted 725 until a clock edge aligns with a signal edge. In this way a phase shifted clock signal 723 is aligned with the signal 713 so that edge 724 of the clock signal 723 aligns with edge 714 of data stream 713. Additionally, a plurality of other edges (e.g., 715-721) are checked against the phase-shifted clock signal 723 as described at step 1006 of FIG. 10 and performed by clock-signal comparator component 1210. After phase shifting the local clock frequency at step 1008, an edge alignment check is performed to see if there is alignment of at least one clock edge. If there is, control goes to step 1006. If there is still no alignment of edges (state transitions) control returns to step 1008 where the clock frequency is shifted again and the alignment check is repeated. This is loop is performed until there is at least one edge alignment. In another embodiment, the phase shifting may be performed by clock frequency setting component 1208, that is, clock phase shifter 1212 may be an inherent function of component 1208. Where there is good agreement between clock edges and signal edges, a frequency match is likely. In the depiction shown in FIG. 7B, the only edge match is that of 714 and 724, no other signal edges match with the clock frequency. In such a case, the clock frequency (associated with signal 723) does not match the frequency of received signal 713. Thus, the self-configuration process has ruled out the first frequency as a match to the received signal. Again, this process is made especially easy when the source is in a default data transmission mode transmitting data through the single channel $L_0$ at the reduced bit rate (e.g., 1.62 Gbps).

However, with continued reference to FIG. 7B, the process continues by setting the clock to a second one of the finite number of clock frequencies (e.g., 2.7 GHz). Similarly, the second clock signal (having the second clock frequency) is phase shifted until a clock period is aligned with an edge of the data stream. Again, as shown in FIG. 7B, the second clock signal 741 (corresponding to a second frequency) is phase-shifted 743 to form phase-shifted clock signal 742. This phase shift aligns clock edge 744 with edge 714 of data stream 713. Additionally, a plurality of other signal edges (e.g., 715-721) are matched against the phase shifted clock signal 742. Here, there is good agreement between clock edges and signal edges. In this case, every signal edge corresponds to a clock edge. Because quite a substantial number of clock edges match with signal edges, the sink determines that the frequency match is correct. Thus, the self-training process has matched the signal frequency of the received data 713 to the second one of the finite number of clock frequencies (e.g., a clock frequency associated with 2.7 Gbps). In this way a reasonably accurate clock signal is achieved. Accordingly, a signal based clock frequency is generated and synchronization between signal and clock are achieved.

In another embodiment, the number of channels being used to send data and the link rate of the data transmission are determined in one process. In this embodiment, instead of testing from the default configuration (e.g., 1 lane, 1.62 Gbps (reduced bit rate)), testing begins at the high end of the potential link configurations.

Sink device 102 starts the SATA Mode with the maximum lane count and bit rate configuration (for example, 4-lanes and 2.7 Gbps HBR). In one embodiment, a timer is started to allow enough time for receiver hardware to conduct auto clock recovery and symbol lock at the maximum configuration. Software checks the internal link status until a timeout occurs. If internal link status shows the link is established and stable, then the sink device 102 will stay in this configuration until AUX Link Configuration Write request IRQ is detected. If the link is not established within a given time frame, the link configuration is changed to the next lower and capable lane count and bit rate (2 lanes, 2.7 Gpbs). The timer is restarted after a new link configuration is applied. This process is repeated until the lowest lane count and bit rate configuration (1-lane RBR) is tried.

Returning to FIG. 6, once the frequencies of the data is determined and an accurate local clock signal is generated, symbol boundaries must be identified for the received data stream (Step 609) in order to perform symbol synchronization, also referred to as symbol locking. This symbol boundary identification and locking may be performed by symbol locking circuitry 453. By obtaining the correct frequency the sink can now obtain accurate reads on the data bits as they are received. It must now determine the symbol boundaries.

FIG. 11 is a flow diagram of a process of symbol boundary identification and symbol synchronization in accordance with one embodiment. In 8B/10B encoding, each symbol comprises a 10 bit "word". Certain words can be used to discern symbol boundaries. Examples include the K28.1 and K28.5 symbols of the 8B/10B standard. In one example control symbol K28.5 of the 8B/10B standard can be used to identify boundaries for symbols in a data stream. The K28.5 symbol can be for example, 001111 1010 or 110000 0101 symbols. Using the 001111 1010 symbol as an example and with reference to FIG. 8, one approach for identifying symbol boundaries is briefly illustrated.

Once the frequency has been determined for the data being read by the sink, a data stream can now be interrogated to identify symbol boundaries. Here, the time synchronized data stream 801 is input into the sink which begins reading the data stream 801 at step 1102. In this example, the data begins at the left and is read left to right. In the stream is a K28.5 symbol 802. Since the sink is not aware of where the symbol boundary is, but does know what one type of symbol boundary looks like (the K28.5 symbol) it begins screening the stream 10 bits at a time looking for the symbol. For example, beginning at 10 bit string 811 and checking to see if it a K28.5 symbol. This is shown at step 1104 where the sink screens a 10-bit stream in the data stream. This is performed by bit stream screening component 1214 This 10 bit string 811 is disregarded as a symbol boundary as it does not match the bit string required for a K28.5.

Figure 8:
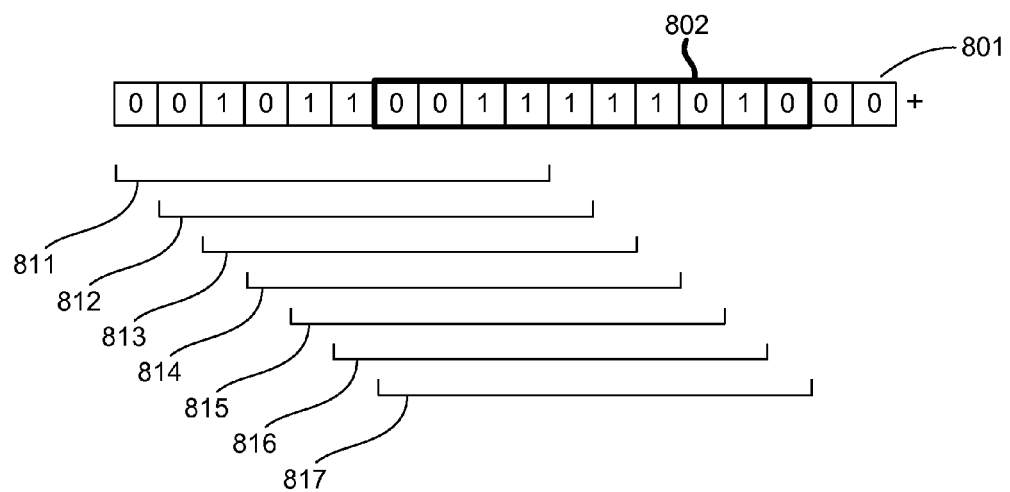
FIG. 8 is another timing diagram illustrating a method embodiment suitable for identifying symbol boundaries in a self-training process in accordance with the principles of the invention.

At step 1106 it is determined whether the stream read at step 1104 is a K28.5 symbol or other suitable "comma character," such as a K28.1 symbol. it is performed by a symbol comparison module 1216, in this case a K28.5 comparison module. In other embodiments, module 1216 may be a K28.1 symbol comparator or other suitable symbol comparator. If the stream is not a comma character there is a one-bit shift to the right and the next 10-bit stream is screened. Step 1106 is repeated to determine if this 10-bit stream is a K28.5 symbol. This is shown in FIG. 8 where the same screening is performed for each of 812, 813, 814, 815, and 816 as each possible 10 bit string is sequentially read one after another. This is repeated until string 817 (also 802) is read as a K28.5 symbol. Once this known symbol is identified at step 1106, control goes to step 1109 where a checking process begins to ensure that the 10-bit stream is in fact a K28.5 symbol. A single K28.5 symbol can possibly be a mistake or a coincidental bit string so the process continues for perhaps a few hundred bits. Until enough K28.5 symbols are identified to define a regular and repeatable pattern consistent with an 8B/10B encoding pattern. At step 1109 a K28.5 counter is set to one. At step 1110 there is another one-bit shift followed by a screening of the next 10 bit stream. At step 1112 it is determined whether the 10-bit stream is a K28.5 symbol. If it is not, control returns to step 1110 and the bits are shifted over by one and the symbol check is performed again at step 1112. The K28.5 counter is still set to one at this point.

If the data stream matches a K28.5 symbol, control goes to step 1114 where the symbol counter is incremented by one. At step 1116, the counter is compared to a threshold number. Three or four may be sufficient with 10 being more than sufficient. Whatever number is selected, if the count is less than this number control returns to step 1110 where the bits are shifted and screened and the process is repeated. If at step 1116 the count is greater than or equal to the threshold number, control goes to step 1118 where the symbol pattern is identified by symbol pattern identifier component 1218. At this stage, the symbol boundaries have been identified and the symbol pattern and rate is now recognizable. At step 1120 the symbol rate is locked with the local clock by symbol synchronizing component 1220. After this symbol synchronization, performed at step 1120, the sink can decode the data stream at step 1122. Thus, such screening can rapidly identify symbol boundaries without link training information (or any other information) from the source device.

Thus, the data stream bit frequency has been determined and the local clock frequency has matched and phase shifted to the data link rate to lock the local clock frequency with the link rate (Step 611). The symbol boundaries have been screened for and identified. Accordingly, a symbol rate is identified and locked to the clock rate. Thus, a decodable data stream has been obtained by the self-configuration process. Advantageously, the process of frequency determination, frequency synchronization (frequency locking) with the local clock, symbol boundary identification, and symbol synchronization (symbol locking) with the local clock are all accomplished without link training information using only the audio-video signal.

Returning to FIG. 5, the data stream is now decoded by the sink device 102 (Step 509). This can be decoded in accordance with a number of schemes. The 8B/10B signal can be converted back to 8-bit signal, the data stream can be converted to an analog signal, and many other decoding processes. For example the modules 431, 420, and/416 of the receiver 102 can be used to decode the signal for input into a display 418. Once decoded the signal can then be forwarded for further processing or displayed using a display media (CRT, LED monitor, LCD monitor, etc.) (Step 511).

As is evident from the discussion above with respect to self-configuration and link training in the absence of link training data at the receiver, it is critical that the quality of the transmission from the transmitter or source to the receiver be high. The accuracy of the data received by the receiver is important in order to enable the receiver to perform self-configuration and link training. The link is first shown in FIG. 1 as data link 103. It is also shown in FIGS. 2B and 3 as link 103. In FIG. 3, the individual uni-directional data channels are shown as 311 ... 312. FIG. 4 also shows data link 103 having a main link 422 (with 1, 2, or 4 channels) and a bi-directional auxiliary channel 424. It also shows a received audio-video signal 423 at a data link interface 404 at receiver 102.

The quality of transmission over data link 103 may be degraded for various reasons. These include attenuation, impedance mismatch, ringing, crosstalk, jitter, and others. As is known in the art, SERDES (serializer-de-serializer)-based interfaces, such as the data links and interfaces described in the networks above, are trying to support increasingly higher bandwidths. At high bit rates or over long cable (i.e., data link 103) distances, it is often very difficult to achieve a sufficient "eye opening" for robust clock data recovery (CDR), also referred to as link clock-to-data recovery, at the receiving end of a serial link, such as link 103. This is because of the effects mentioned, such as attenuation, crosstalk, jitter, etc. To achieve a robust link CDR performance at high bit rates or over long data link distances, a signal peak detection integrated circuit package and methods are described.

As described above, the bit rate of the video data (or other type of data) being transmitted over data link 103 may be 2.7 Gbps. This bit rate is acknowledged in the field at the time of the invention to be a high bit rate. Although the length of the data link 103 is not discussed specifically, it can also be long depending on the size of multimedia network in which the video signal is being transmitted (e.g., a home environment, an office, a home theater or commercial theater, public spaces, such as restaurants, and so on). In any case, it can be assumed that often the length of data link 103 may be long enough so that attenuation, in particular, may be an issue when transmitting data, especially at a high bit rate, such as 2.7 Gbps. This may be referred to as high-frequency attenuation, which is often a more serious issue with short bits, as described below.

In one embodiment, there is at least one hardware logic module at the receiver to detect the signal level of an incoming signal at the receiver interface 404. In other embodiments, there may be two hardware logic modules. Data from the one or more hardware logic modules are processed and a request for a new signal level of the incoming signal is requested by the sink device (receiver) to the source (transmitter). In another embodiment, the internal settings of the receiver are adjusted based on these data from the hardware logic modules and an adjusted signal level is achieved within the sink device without having to send a request or any data to the source.

Figure 13:
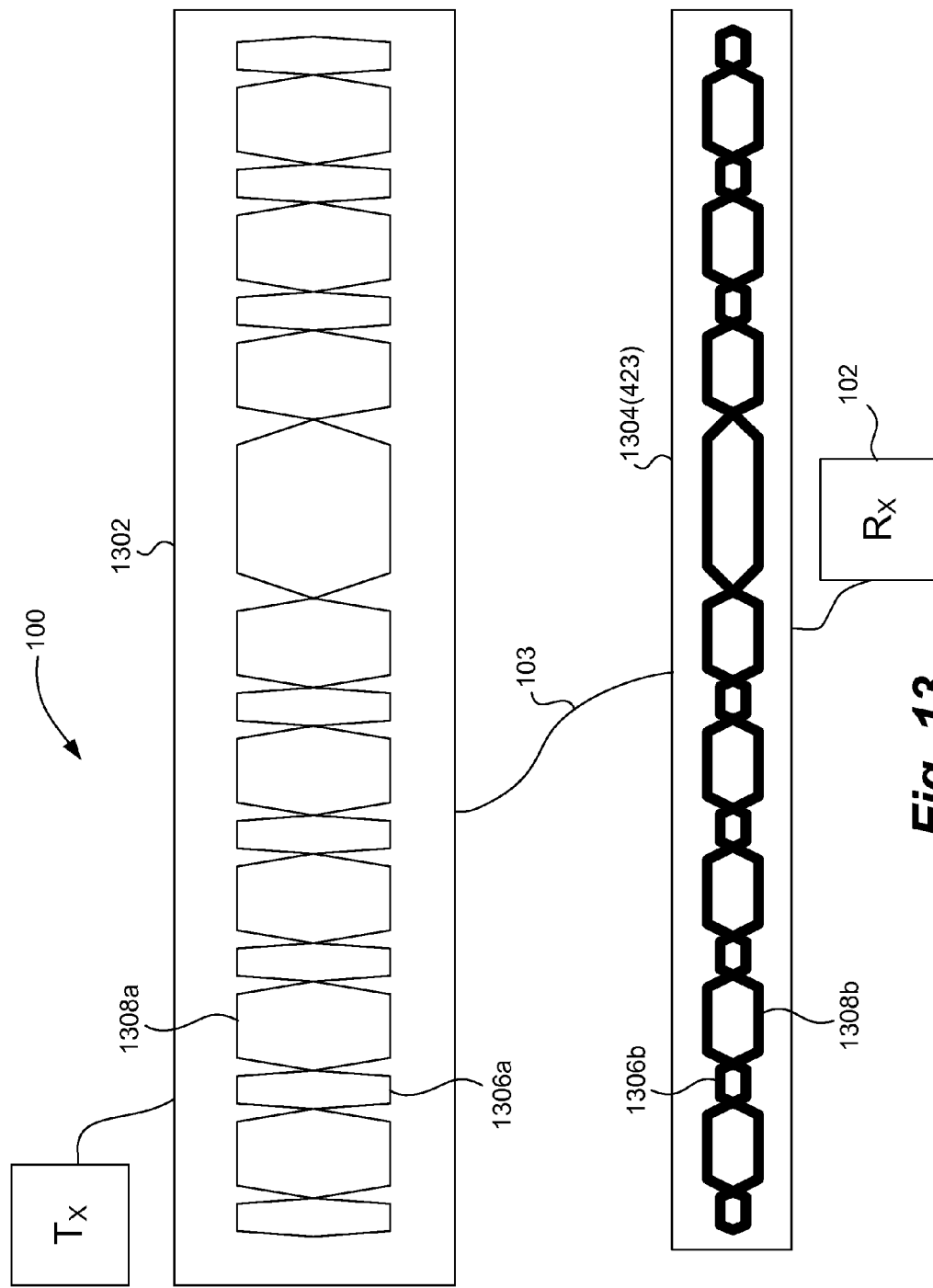
FIG. 13 is a basic network diagram showing how a signal can become deteriorated at high bit rates or long data link distances.

FIG. 13 is a basic network diagram showing how a signal can become deteriorated at high bit rates or long data link distances. Some of the components of network 100 have been described above in FIG. 1, such as transmitter 101, data link 103 and receiver 102. A signal 1302, which may be referred to as an initial signal, is transmitted from source 101 over data link 103 to receiver 102. By the time initial signal 1302 is received at the input pin of the receiver interface (such as interface 404), it may look like signal 1304 (also shown as signal 423 in FIG. 4). It is shown outside of receiver 102 for ease of illustration. It is evident from FIG. 13 that the initial signal 1302 has deteriorated over data link 103, maybe because of a high transmission rate, a long data link distance, or both. These characteristics can often cause attenuation in the signal. The receiver 102 receives a degraded signal and will have difficulty in recovering the information from source 101 correctly. If it cannot recover the information correctly, it will not be able to perform the link self-configuration described above.

Initial signal 1302 has at least one short bit 1306a and one long bit 1308a. A signal is comprised of transitions from 0 to 1 and 1 to 0, as described above. A high frequency signal may transition between 0 and 1 in every alternative bit (i.e., 0101010101 ... ) This is what the clock information from the transmitter to the source may be when link training data is, in fact, transmitted to the receiver and when normal link training is enabled (i.e., there is no hot plug event). A short bit occurs when there is a transition from 0 to 1 or 1 to 0 without any two or more consecutive 0's or 1's. At 1.62 Gbps, a short bit is approximately 617 pico seconds. These are represented by most narrow columns or hexagons shown in signal 1302. The height of the hexagon represents the amplitude of the signal, indicating specific signal strength. Long bit 1308a represents a transition occurring after at least two consecutive 0's or 1's (e.g., a time greater than 617 pico seconds when the bit rate is 1.62 Gbps). In any case, regardless of the specific bit rate and "bit time," a long bit occurs when there are two or more 0's or 1's. FIG. 13 shows that there can be degradation of signal 1302 on both the long bits and short bits. In signal 1304 it can be seen that short bit 1306b has been degraded from 1306a to a significantly lower signal strength, for example, because of attenuation. Similarly, long bit 1308a in signal 1302 has been degraded to 1308b in signal 1304. In both cases, the signal strength has been degraded, thus making it difficult for the receiver 102 to recover the original data.

Figure 14:
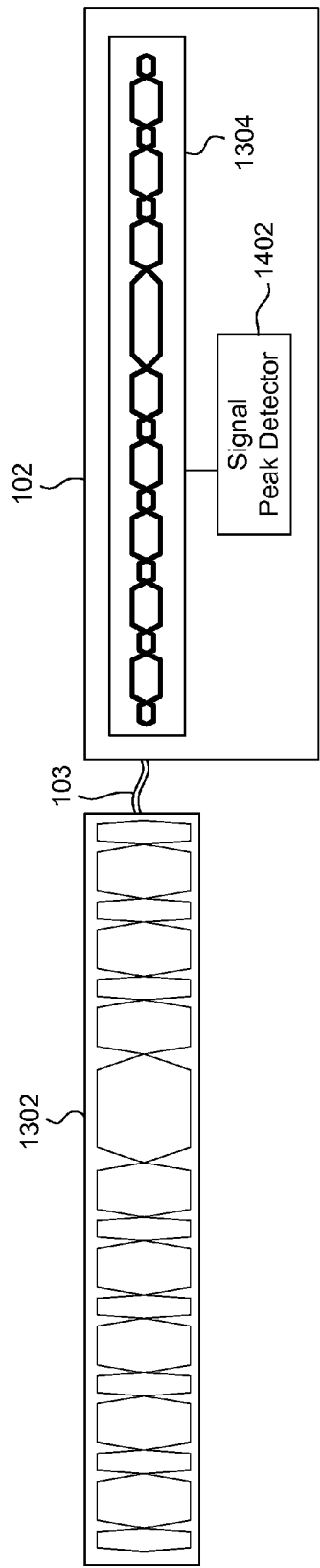
FIG. 14 is a network diagram showing an incoming initial signal being transmitted over a data link to a receiver having a signal peak detector in accordance with one embodiment of the present invention.

FIG. 14 is a network diagram showing an incoming initial signal 1302 being transmitted over data link 103 to a receiver 102 having a signal peak detector 1402 in accordance with one embodiment of the present invention. Receiver 102 has a signal peak detector 1402 that measures the voltage swing or voltage level of signal 1304. Signal peak detector 1402 may be an analog-digital converter (ADC) or an analog level detector capable of measuring the signal (either single-ended or differential) voltage swing and/or level. In one embodiment, signal peak detector measures or is on the short bit of signal 1304 or on a long bit. Thus, FIG. 14 shows receiver 102 having signal peak detector 1402 specifically for the purpose of measuring incoming received signal 1304.

FIG. 15A is a detailed network diagram showing data link 103 and receiver 102 with a signal peak detector 1402 in accordance with one embodiment. Data link 103 connects to sink device (receiver) 102 (certain components of the receiver are not shown here for ease of illustration, but are shown in FIGS. 4 and 12 above). Receiver 102 receives incoming signal 1304 which has been degraded via transmission over data link 103. Signal peak detector 1402 measures signal 1304 (either a short bit or a long bit). Detector 1402 is connected to a state machine 1502 which uses data from signal detector 1402. The data from signal detector 1402, depending on the type of device, may be a voltage swing or level, measured in volts. It is an approximate true peak voltage value of the signal applied to the detector, in this case, signal 1304. The state machine 1502 takes this voltage reading from detector 1402. State machine 1502 may be implemented as software or hardware. It takes the voltage measurement of signal 1304 and determines whether to transmit a request 1504 to the transmitter 101 (not shown) via data link 103.

Request 1504 may be a request for pre-emphasis to transmitter 101. It requests a higher voltage swing on either a short bit or a long bit. In a preferred embodiment, a single signal peak detector 1402 is on a short bit given that with high frequencies, short bits experience a higher attenuation. The concept of pre-emphasis is known in the field. It is a way to increase the power of the initial signal at the transmitter end so that the signal that is eventually received at the receiver is closer to the initial signal; essentially it is a way to compensate for transmission degradation so that the receiver receives a signal that is much closer to the initial or original signal. The state machine 1502 may have a data table that provides instructions on how much pre-emphasis to ask for given the voltage reading of signal 1304 and at what time to apply the pre-emphasis. Conventionally, there is some trial-and-error in determining what level of pre-emphasis is needed or is appropriate and when the pre-emphasis should be applied.

Request 1504 is created by state machine 1502 and transmitted to the transmitter 101 via a bi-directional auxiliary channel 424 or other suitable sideband communication channel in data link 103. Once the transmitter 101 receives request 1504, it will adjust the signal power level at the appropriate time to compensate for signal degradation, that is, it will either apply pre-emphasis on the short bit, long bit, or both, or it will apply a specific gain. If the state machine determines that neither pre-emphasis or gain is needed based on the signal voltage measurement, it will not send a request to the transmitter.

FIG. 15B shows the results of applying request 1504. An adjusted or modified signal 1506 from the transmitter shows noticeably higher amplitudes for both the short bits and the long bits, the result of pre-emphasis or gain. The improved signal received is shown as signal 1508 showing higher long and short bit amplitudes or strength and more closely resembling the initial signal 1302. Receiver 102 is then able to take signal 1508 and perform frequency and symbol locking as described in FIGS. 10 and 11. The improvement can be seen by comparing signal 1304 and 1508. Although signal 1508 is not identical to 1302, it is much closer to it (i.e., shows less degradation) than signal 1304.

Figure 16A:
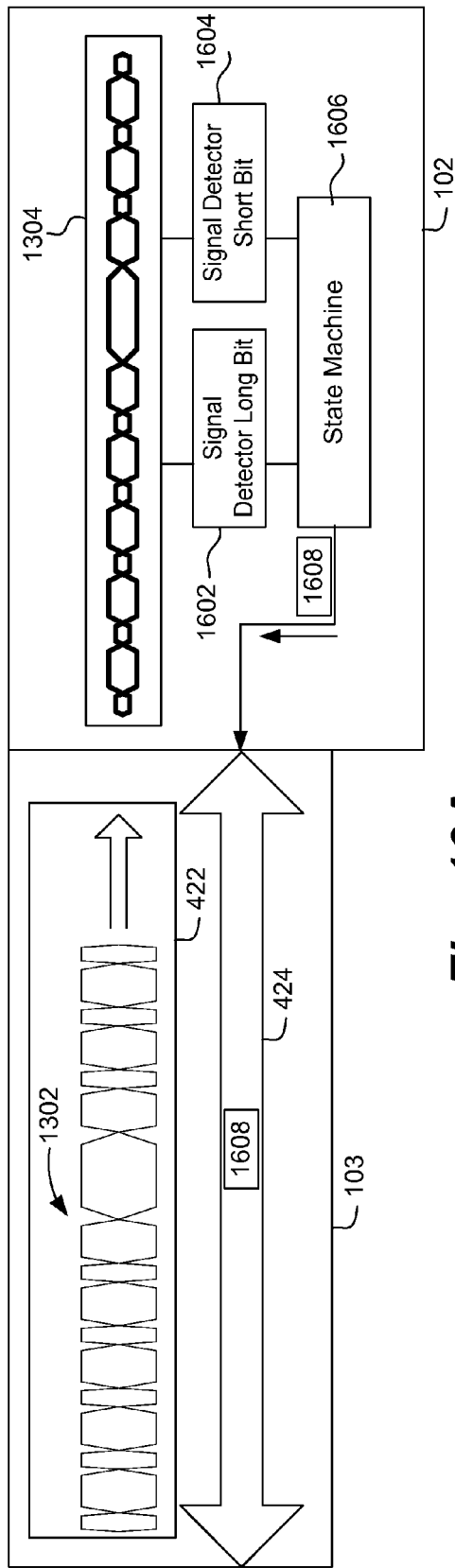
FIG. 16A is a network diagram showing a data link and a receiver having two signal peak detectors in accordance with one embodiment.

FIG. 16A is a network diagram showing a data link and a receiver having two signal peak detectors in accordance with one embodiment. Many of the components in FIG. 16A are similar to those in FIG. 15A. The data link 103 has the same components, namely a bi-directional auxiliary channel or side band channel 424 and a main data link 422 carrying signal 1302. However, in receiver 102, there are two signal peak detectors. A detector 1602 on a long bit and detector 1604 on a short bit. Each signal peak detector measures the voltage peak for either a long bit in signal 1304 or a short bit in signal 1304. The approximate voltage peaks from each detector are input to a state machine 1606. It uses these voltage readings to determine whether a pre-emphasis or gain request should be created and sent to the transmitter to adjust the power level of the signal. The concept here is the same as shown in FIG. 15A where one signal peak detector is used, however, with two detectors the pre-emphasis or gain request 1608, may be more accurate. As noted above, if only one detector is used, it is preferable that it be on the short bit. Request 1608 is sent to transmitter 101 (not shown) via auxiliary channel 424.

Figure 16B:
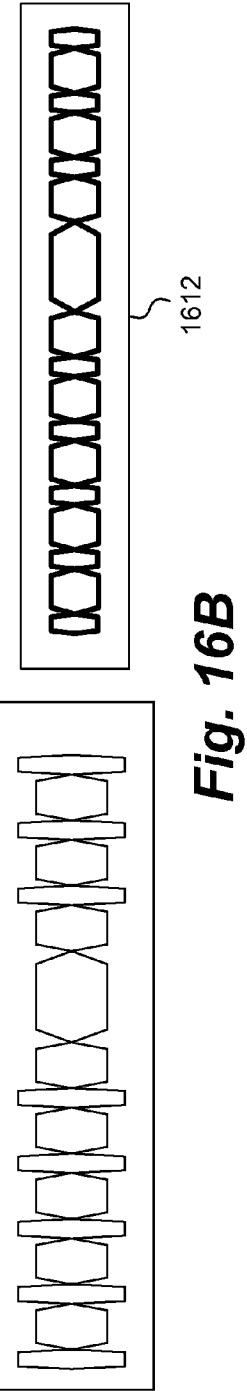
FIG. 16B shows a signal created as a result of the request where pre-emphasis or gain is applied to signal at the appropriate time.

In this manner, a signal 1610 shown in FIG. 16B, is created as a result of request 1608 where pre-emphasis or gain is applied to signal 1302 at the appropriate time. As can be seen in signal 1610, the power level of the short bit is much higher than in the original signal 1302 to compensate for the attenuated (or otherwise degraded) level of the short bit shown in signal 1304. The long bit is also shown to be slightly higher. By applying pre-emphasis and/or gain at the right time based on readings from long bit signal detector 1602 and short bit signal detector 1604, with a high degree of specificity, the signal 1612 received is notably improved from signal 1304.

Figure 17A:
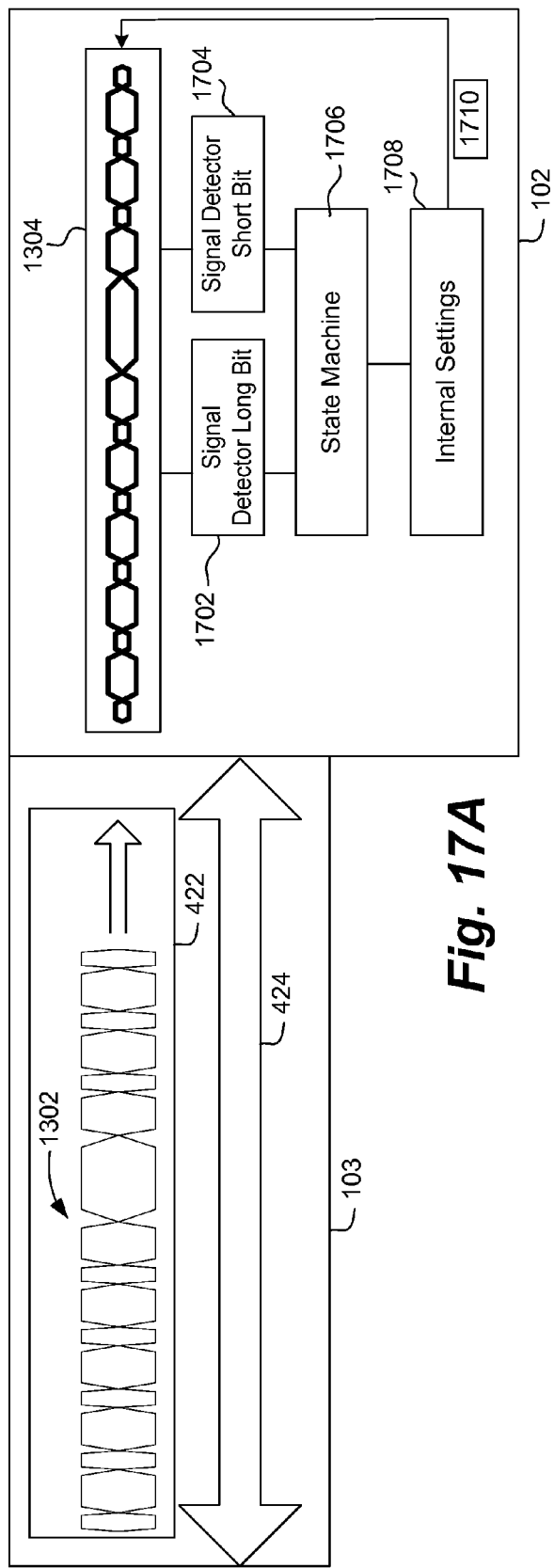
FIG. 17A shows a signal improved using internal settings in the receiver and without sending a request to transmitter in accordance with one embodiment.

In another embodiment, the signal level of the received signal 1304 is improved using internal settings in the receiver and without sending a request to transmitter 101. This embodiment is shown in FIG. 17A. The data link 103 is the same as described above with auxiliary channel 424 and main channel 422 carrying signal 1302. However, in this embodiment, there is no request being sent to the transmitter via channel 424. At the receiver 102 there is a signal peak detector 1702 on the long bit and a signal peak detector 1704 on the short bit. In another embodiment, there may be only one peak detector, as shown in FIG. 15A. Outputs from these detectors are inputted to a state machine 1706. State machine 1706 outputs a value or specific data to an internal settings module 1708, which represents a means of adjusting various internal settings in receiver 102, such as termination resistance or equalization levels. Output 1710 from internal settings module 1708 (which may also be described as a settings adjustment module) is applied to various settings in receiver 102 with the objective of optimizing the received signal 1304 at the receiver interface 404 (not shown in FIG. 17A). This is shown symbolically as output 1710 being directed to signal 1304 for ease of illustration. From an implementation perspective, internal settings module 1708 causes adjustments to settings in the receiver, such as changing the equalization level, so that the signal 1304 is optimized at the incoming pin.

Figure 17B:
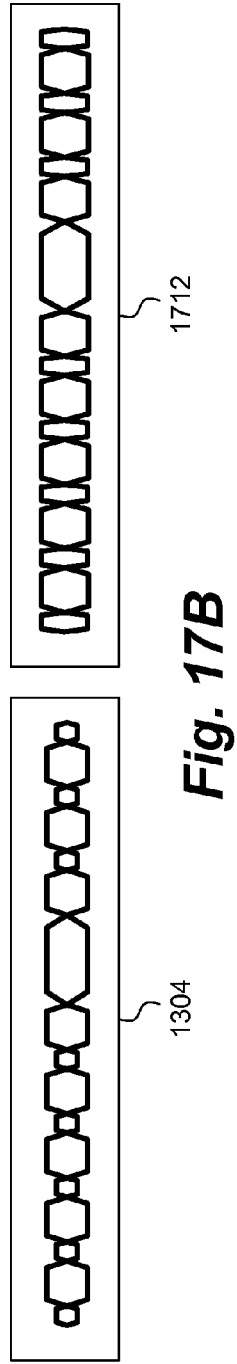
FIG. 17B shows an optimized incoming signal resulting from adjusting internal settings at the receiver.

This is shown in FIG. 17B. The signal 1304 shows a degraded signal at the incoming pin of the receiver link interface, especially on the short bit which is more highly affected by attenuation from long cable lengths and/or high bit rates. However, after applying internal settings 1710 from module 1708, a signal 1712 is created which has a stronger level on both the short bits and long bits and more closely resembles initial signal 1302. In many cases, the internal adjustment to the settings may involve adjusting the equalization levels at the link interface 404, but other internal setting adjustments may also be applied, such as termination resistance.

Figure 18:
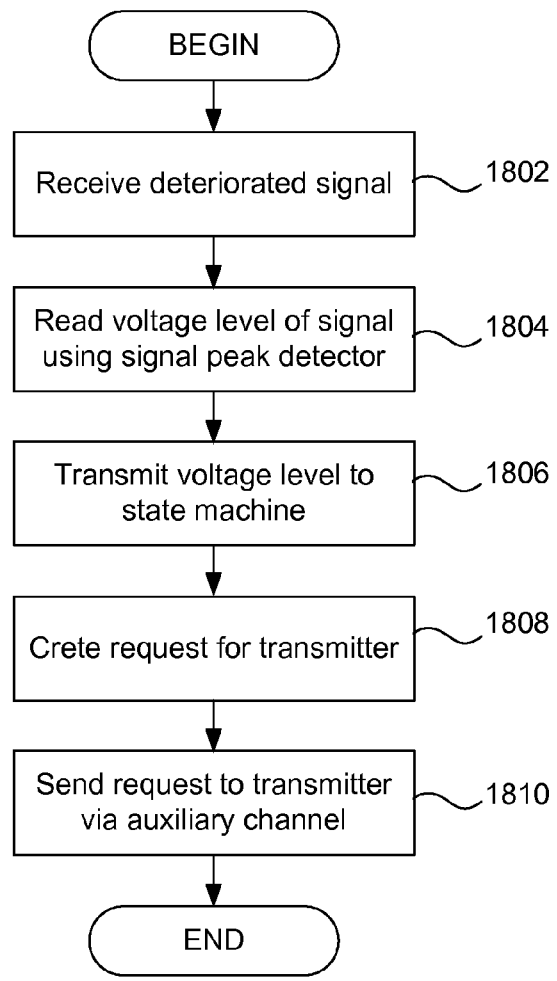
FIG. 18 is a flow diagram showing a process of using signal peak detectors for optimizing the clock data recovery (CDR) of a high-speed serial data interface in accordance with one embodiment.

FIG. 18 is a flow diagram showing a process of using signal peak detectors for optimizing the clock data recovery (CDR) of a high-speed serial data interface in accordance with one embodiment. At step 1802 a degraded or deteriorated signal is received by a receiver. As noted above, this deterioration of the signal may be caused by high bit rates and/or long cable (data link) lengths. It is particularly noticeable on the short bits of the incoming signal because of the short amount of time between state transitions (or bit time between 01010101 . . . transitions). The degraded signal makes it difficult for the receiver to perform accurate link self-configuration as described above. However, more generally, such degradation in the signal makes it difficult for the receiver to recover the information from the signal, whether that signal be the video or audio content, multimedia content, or the link training information (e.g., link training patterns 1 and 2) in the scenario where normal link training occurs between the transmitter (DPTX) and receiver (DPRX). Of course, in general, it is always desirable to improve the quality of the signal being received regardless of the particular context. In this respect, the methods described here and in FIG. 13 onwards may be applied in many different contexts. Applying it to the context of receiver link self-configuration, the subject of the present invention, is but one application.

At step 1804 one or more signal peak detectors are used to read or detect the signal level of the receiver interface, thereby obtaining the signal level of the incoming signal. As noted, the detectors may be ADC or analog level detectors, or any other suitable device capable of measuring the signal voltage swing or level. In another embodiment, the detectors may be used to detect a differential signal level between a long bit and a short bit in the signal. Some example voltage readings may range from 100 milivolts (mV) to 1.2 volts (1200 mV). At step 1806 the voltage reading or readings (if more than one detector) are used as input to a state machine. This state machine may be implemented as a software module, a hardware component, or as firmware. It takes as input the voltage level (and whether it is on a long bit or short bit) and determines the appropriate changes that should be made to the original signal. For example, if the differential voltage is a certain amount, then a particular pre-emphasis should be applied. In another example, if the voltage of the long bit and short bit are same or close, an appropriate gain value is determined. These values may be determined based on the specific characteristics of the network, such as cable length, bit rate, the transmitter, and other factors. Examples of pre-emphasis values may range from 0 dB to 9.5 dB. Examples of gain values may range from 400 mV to 1200 mV. Of course, these are only examples of the range of values that the request may contain.

The request is created at step 1808 which contains either a pre-emphasis value, a gain, or both. The request can be for a higher voltage swing on the short bit, the long bit, or both. For example, if it is detected that the long bit is 400 mV and the short bit is 100 mV, the request may instruct for a high pre-emphasis on the short bit at the appropriate time. In another scenario, the long bit may be 400 mV and the short bit 350 mV, in which case no request may be sent since there is little attenuation and any pre-emphasis may cause jitter or reflection, thus making the signal worse. In another scenario, the long bit may be 150 mV and the short bit may be 100 mV. In this case there is attenuation (e.g., long cable), but since the two measurements are close, the request may only ask for increased gain and no pre-emphasis.

This determination is made at the receiver and instructions are sent to the transmitter at the appropriate time. In one embodiment, the request is sent at a specific time so that the optimization is applied to the signal at the transmitter at the best or appropriate time. The request itself can be in any suitable format and may depend on the properties of the transmitter. The time at which the request is sent or the time indicated in the request as to when the pre-emphasis or gain should be applied is one factor which eliminates the need for conventional pre-emphasis being applied in a "trial-and-error" manner, that is, testing different pre-emphasis or gain values to see which ones provide an optimized signal at the receiver interface. This trial-and-error method is undesirable since it takes time to obtain an optimized signal and, at high bit rates, data may be lost in the process. The method of sending a request is also beneficial in situations where the receiver does not have any information about the transmitter, such as during link self-configuration. The signal peak detectors can measure the signal level without having to have any knowledge of the transmitter, such as signal strength at the transmitter interface, clock information, or other data.

At step 1810 the request is transmitted to the transmitter via auxiliary channel in the data link. The transmitter receives the request and makes the appropriate changes to the signal transmission level. The signal that is then sent has a power level that compensates for the signal deterioration and the signal that is received more closely resembles the initial signal at the transmitter (before the signal power compensation). As described above, in another embodiment, instead of sending a request to the transmitter, the receiver can adjust its internal settings based on output from the state machine at the input pin and adjust the signal internally without having to communicate with the transmitter. Another situation where internal settings, such as equalization, may be used is when pre-emphasis will not be sufficient or the increase in gain that would be needed cannot be obtained (i.e., exceeds maximum gain value). In these cases, adjusting the internal settings may be the only option. Thus, in another embodiment, the receiver has the ability to either send a request to the transmitter or adjust internal settings. This determination can be made by the state machine based on data about the limits of pre-emphasis or gains that can be applied. In this embodiment, the output from the state machine may be either a request or instructions to the internal settings module, depending on how much pre-emphasis or gain is needed.

In addition, embodiments of the present invention further relate to integrated circuits and chips (including system on a chip (SOC)) and/or chip sets. By way of example, each of the devices described herein may include an integrated circuit chip or SOC for use in implementing the described embodiments and similar embodiments. Embodiments may also relate to computer storage products with a computer-readable medium that has computer code thereon for performing various computer-implemented operations. The media and computer code may be those specially designed and constructed for the purposes of the present invention, or they may be of the kind well known and available to those having skill in the computer software arts. Examples of tangible computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor. In addition to chips, chip systems, and chip sets, the invention can be embodied as firmware written to said chips and suitable for performing the processes just described.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of adjusting a signal between a transmitter and a receiver, the method comprising:
   receiving an initial signal having an initial signal level from the transmitter, the initial signal having a first long bit and a degraded first short bit;
   utilizing a first signal peak detector circuit in the receiver to measure a first signal voltage of the first long bit of the initial signal;
   utilizing a second signal peak detector circuit in the receiver to measure a second signal voltage of the degraded first short bit of the initial signal;
   determining a pre-emphasis value based on measurements from the first and second signal peak detector circuits, the pre-emphasis value representing a first level for a second long bit and a second level for a second short bit, wherein the first level is different from the second level; and
   to compensate for the degraded first short bit, communicating the pre-emphasis value and a time value of when the pre-emphasis value is to be applied to the transmitter, thereby causing the transmitter to transmit a second signal using an adjusted signal level associated with one of: 1) a second long bit, or 2) a second short bit, or 3) a second long bit and a second short bit.

2. The method a recited in claim 1 further comprising:
   utilizing at least two signal peak detectors, wherein one of the at least two signal peak detectors is used to measure the first signal voltage and another of the at least two signal peak detectors is used to measure the second signal voltage.

3. The method as recited in claim 2 wherein utilizing the first signal voltage to determine a pre-emphasis value further comprises:
   using the second signal voltage.

4. The method as recited in claim 1 wherein utilizing the first signal voltage to determine a pre-emphasis value further comprises:
   using a state machine having data relating to appropriate pre-emphasis values and timing.

5. The method as recited in claim 2 wherein the first signal peak detector measures the long bit and the second signal peak detector measures the short bit.

6. The method as recited in claim 1 wherein the adjusted signal is used for link training between the transmitter and the receiver and wherein the signal is an 8B/10B encoded signal.

7. The method as recited in claim 1 wherein communicating is performed via an auxiliary channel of a data link between the transmitter and the receiver.

8. The method as recited in claim 1 wherein the signal is a video data signal not having associated link training data.

9. The method as recited in claim 1 wherein the signal is received after video basic input and output system of the transmitter has initiated and before an operating system of the transmitter has become operational.

10. A method of adjusting a signal received at a receiver from a transmitter, the method comprising:
    receiving an initial signal having a degraded initial signal level from the transmitter, the initial signal having a long bit and a short bit, the short bit being degraded with respect to the long bit;
    utilizing at least two signal peak detectors, wherein a first signal peak detector of the at least two signal peak detectors is used to measure an initial voltage of the long bit and a second peak detector of the at least two signal peak detectors is used to measure the initial voltage of the short bit;
    determining a pre-emphasis value and a time value based on measurements from the at least two signal peak detectors, the pre-emphasis value representing a first level for a second long bit and a second level for a second short bit, wherein the first level is different from the second level; and
    compensating for the degraded initial signal level by adjusting internal settings of the receiver to apply the pre-emphasis value at the determined time value, thereby creating an adjusted signal associated with one of: 1) the long bit, or 2) the short bit, or 3) the long bit and the short bit, wherein the internal settings comprise one of termination resistance and equalization levels, and the internal settings produce a first signal level change in the short bit and a second signal level change in the long bit, wherein the second signal level change differs from the first signal level change.

11. The method as recited in claim 10 wherein adjusting internal settings further comprises:
    using a state machine having data relating to appropriate internal settings.

12. The method as recited in claim 10 wherein the signal is a video data signal not having associated link training data.

13. The method as recited in claim 10 wherein the signal is received after video basic input and output system of the transmitter has initiated and before an operating system of the transmitter is operational.

14. An integrated circuit device for improving the quality of a degraded incoming signal at a receiver, the device comprising:
    signal peak detection circuitry for measuring an initial voltage of a long bit of the degraded incoming signal;
    signal peak detection circuitry for measuring an initial voltage of a short bit of the degraded incoming signal;
    a state machine module to compensate for the degraded initial signal by determining suitable pre-emphasis values and suitable time values, the suitable pre-emphasis values based on measurements from the signal peak detection circuitry, the suitable pre-emphasis values representing a first level for a second long bit and a second level for a second short bit, wherein the first level is different from the second level, the state machine to apply the suitable pre-emphasis values at the suitable time values to create an adjusted signal associated with one of: 1) the long bit, or 2) the short bit, or 3) the long bit and the short bit, wherein;
    a clock;
    a link interface operational with a data link; and
    link communication circuitry for examining the incoming signal for link training data.

15. The integrated circuit device as recited in claim 14 further comprising:
    an internal settings module for adjusting settings in the receiver.

16. The integrated circuit device as recited in claim 14 wherein signal peak detection circuitry further comprises:
- a first signal peak detection circuitry; and
- a second signal peak detection circuitry.

17. The integrated circuit device as recited in claim 14 wherein signal peak detection circuitry is an analog-digital converter capable of measuring a signal voltage swing.

18. A non-transitory tangible computer-readable medium containing computer instructions for adjusting a signal between a transmitter and a receiver, the computer instructions comprising:
- instructions for receiving an initial signal having a degraded initial signal level from the transmitter, the initial signal having a first long bit and a first short bit;
- instructions for measuring a first signal voltage of the initial signal, the first signal voltage being a voltage of the first long bit;
- instructions for measuring a second signal voltage of the initial signal, the second signal voltage being a voltage of the first short bit;
- instructions for determining a pre-emphasis value, the pre-emphasis value representing a first signal level adjustment for a second long bit and a second signal level adjustment for a second short bit, wherein the first signal level adjustment is different from the second signal level adjustment; and
- instructions for communicating the pre-emphasis value and a time value of when the pre-emphasis value is to be applied to the transmitter, thereby causing the transmitter to transmit a second signal using an adjusted signal level associated with one of: 1) a second long bit, or 2) a second short bit, or 3) a second long bit and a second short bit.

19. The non-transitory tangible computer-readable medium as recited in claim 18 wherein instructions for determining a pre-emphasis value further comprise:
- instructions for using a state machine having data relating to appropriate pre-emphasis values and timing.

20. A non-transitory tangible computer-readable medium containing computer instructions for adjusting a signal received at a receiver from a transmitter, the computer instructions comprising:
- instructions directing the receiver to receive an initial signal having a degraded initial signal level from the transmitter, the signal having a long bit and a short bit;
- instructions directing the receiver to measure an initial voltage of the long bit and the an initial voltage of the short bit of the initial signal utilizing at least one signal peak detector;
- instructions for directing the receiver to compensate for the degraded initial signal level by determining suitable pre-emphasis values and suitable time values, the suitable pre-emphasis values based on measurements from the at least one signal peak detector, the suitable pre-emphasis values representing a first level change for a second long bit and a second level change for a second short bit, wherein the first level change is different from the second level change; and
- instructions to apply the suitable pre-emphasis values at the suitable time values to adjust internal settings of the receiver, thereby creating an adjusted signal associated with one of: 1) the long bit, or 2) the short bit, or 3) the long bit and the short bit, wherein the internal settings comprise one of termination resistance and equalization levels.

* * * * *